(12) United States Patent
Kamerath et al.

(10) Patent No.: US 11,274,781 B1
(45) Date of Patent: Mar. 15, 2022

(54) IRRIGATION LINE COUPLINGS AND IRRIGATION MANIFOLDS INCLUDING IRRIGATION LINE COUPLINGS

(71) Applicant: Orbit Irrigation Products, LLC, North Salt Lake, UT (US)

(72) Inventors: Christopher James Kamerath, Herriman, UT (US); Eric Tres Wangsgaard, Salt Lake City, UT (US)

(73) Assignee: Orbit Irrigation Products, LLC, North Salt Lake, UT (US)

( * ) Notice: Subject to any disclaimer, the term of this patent is extended or adjusted under 35 U.S.C. 154(b) by 249 days.

(21) Appl. No.: 16/696,927

(22) Filed: Nov. 26, 2019

Related U.S. Application Data

(60) Provisional application No. 62/774,221, filed on Dec. 1, 2018.

(51) Int. Cl.
*F16L 37/091* (2006.01)

(52) U.S. Cl.
CPC .................. *F16L 37/0915* (2016.05)

(58) Field of Classification Search
CPC .................. F16L 37/091; F16L 37/0915
See application file for complete search history.

(56) References Cited

U.S. PATENT DOCUMENTS

| 1,195,433 | A | 8/1916 | Bailey | |
|---|---|---|---|---|
| 4,123,090 | A | 10/1978 | Kotsakis | |
| 5,395,139 | A | 3/1995 | Morrisson | |
| 6,682,106 | B2 | 1/2004 | Parker | |
| 7,021,669 | B1* | 4/2006 | Lindermeir | F16L 37/133 285/86 |
| 8,240,715 | B2 | 8/2012 | Itou | |
| 8,844,974 | B1* | 9/2014 | Crompton | F16L 37/0915 285/39 |
| 9,068,680 | B1* | 6/2015 | Crompton | F16L 37/0982 |
| 9,151,427 | B2 | 10/2015 | Imanishi | |
| 9,781,886 | B1 | 10/2017 | Wangsgaard | |
| 2001/0013700 | A1 | 8/2001 | Mintz | |
| 2002/0163194 | A1 | 11/2002 | Mintz | |
| 2013/0200607 | A1* | 8/2013 | Rodenberg | F16L 37/0915 285/82 |
| 2020/0263818 | A1* | 8/2020 | Prince | F16L 21/03 |

\* cited by examiner

*Primary Examiner* — David Bochna
(74) *Attorney, Agent, or Firm* — Austin Rapp

(57) ABSTRACT

Irrigation line couplings are disclosed. The irrigation line couplings may each include a lockable release mechanism that may be positioned in a locked position or a released position. The irrigation line couplings may be incorporated into an irrigation manifold or other type of irrigation component, such as fittings (tees, elbows, etc.), valves, filters, pressure regulators, emitters, and adapters.

17 Claims, 23 Drawing Sheets

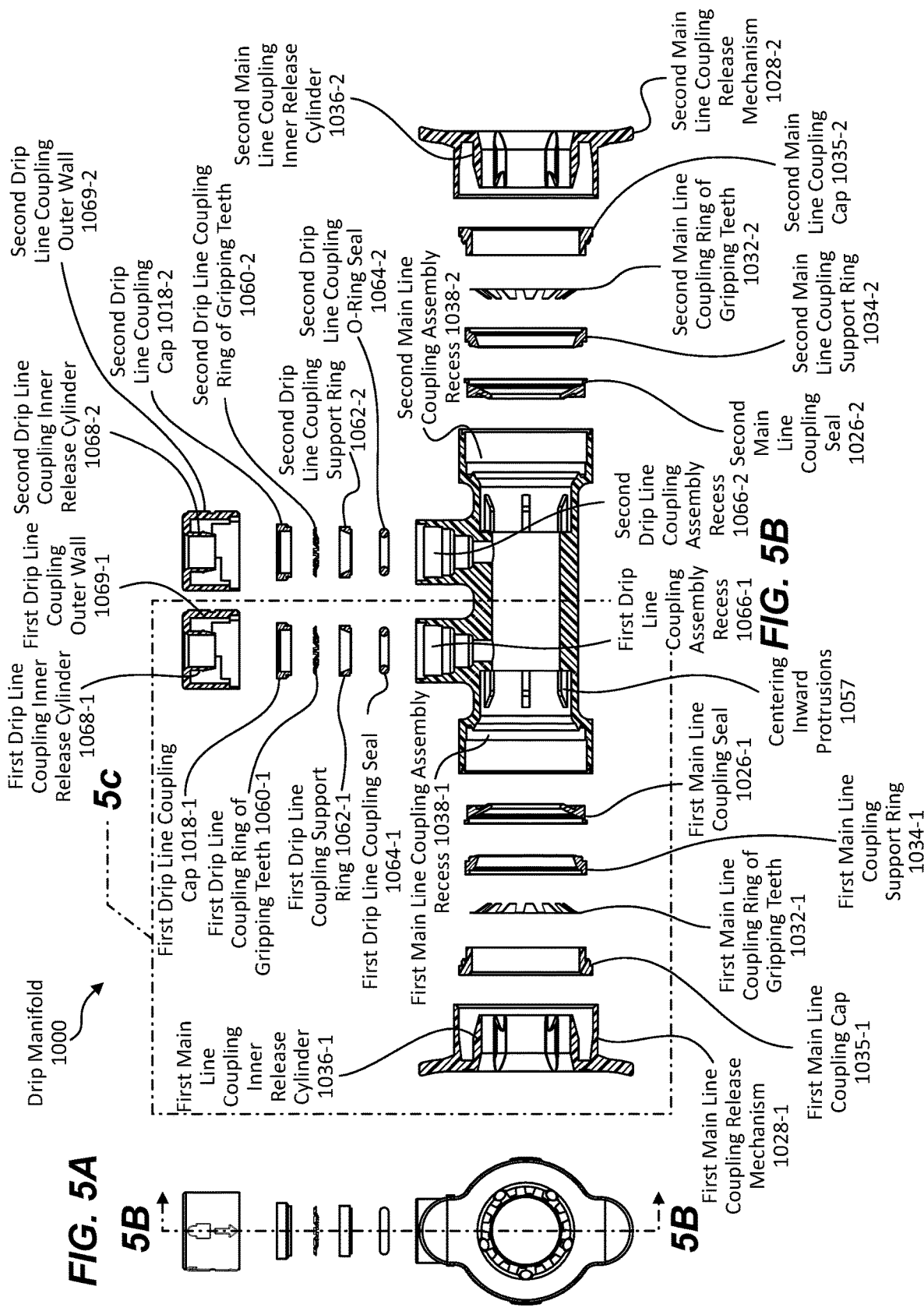

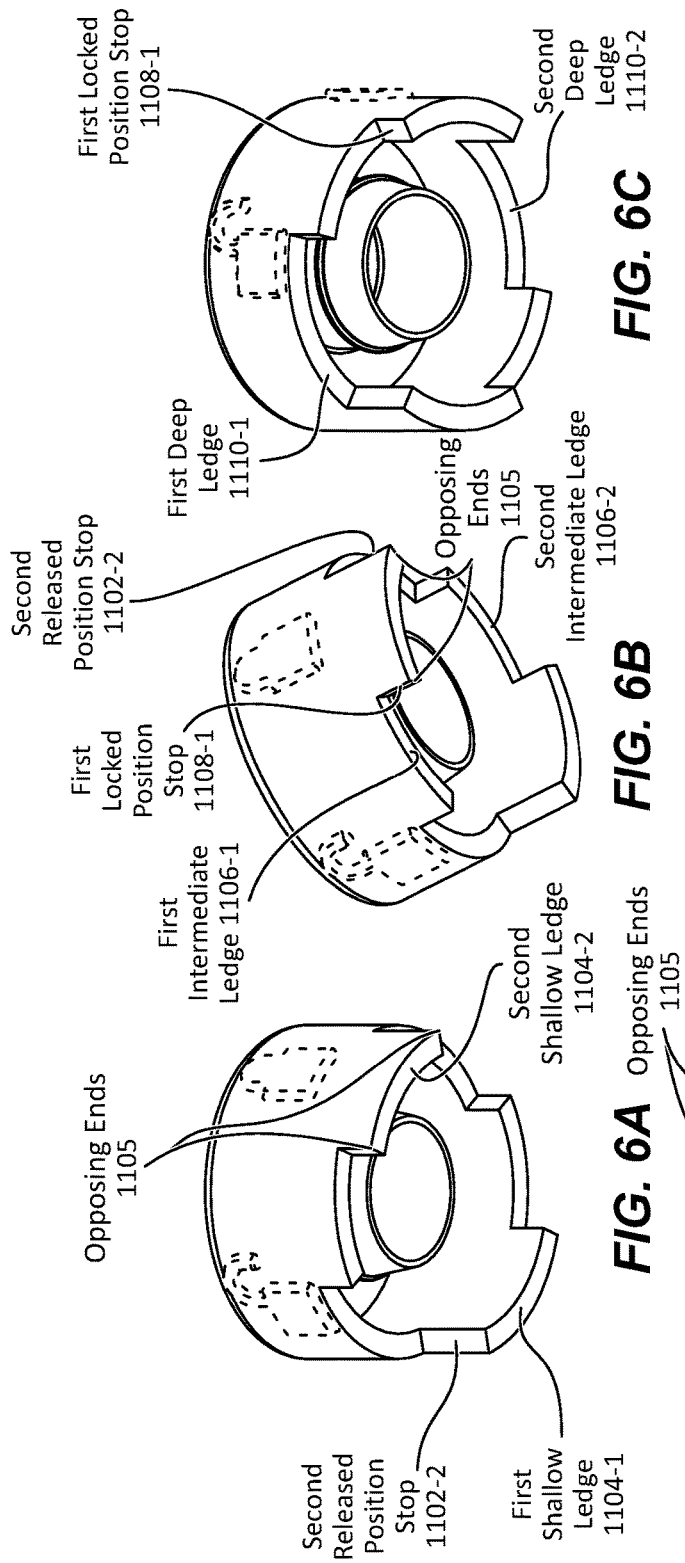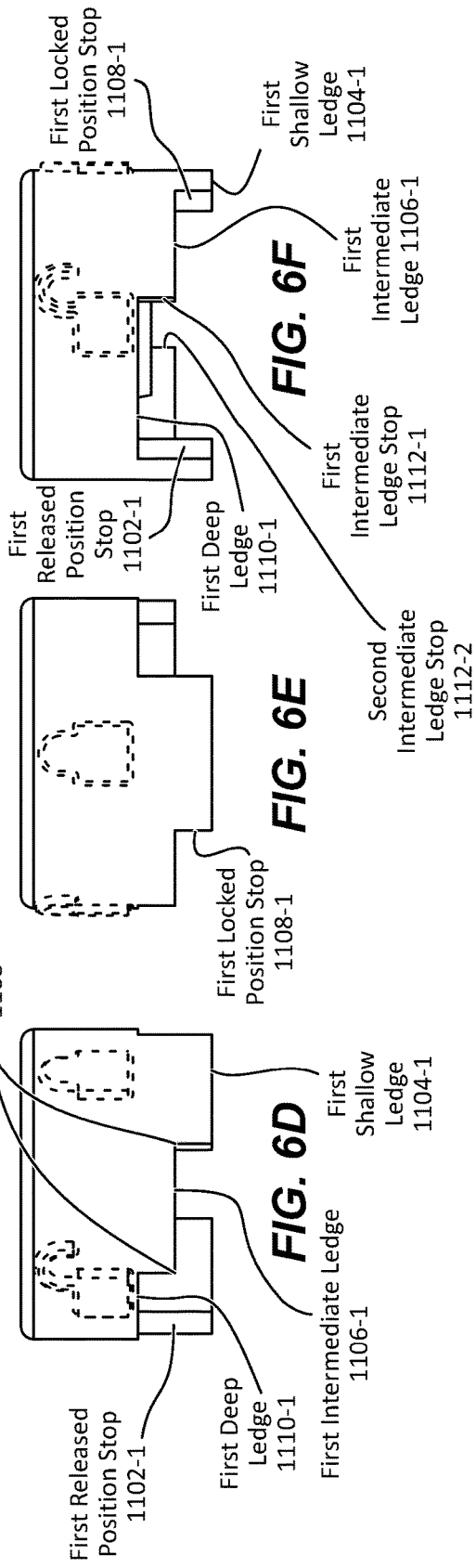

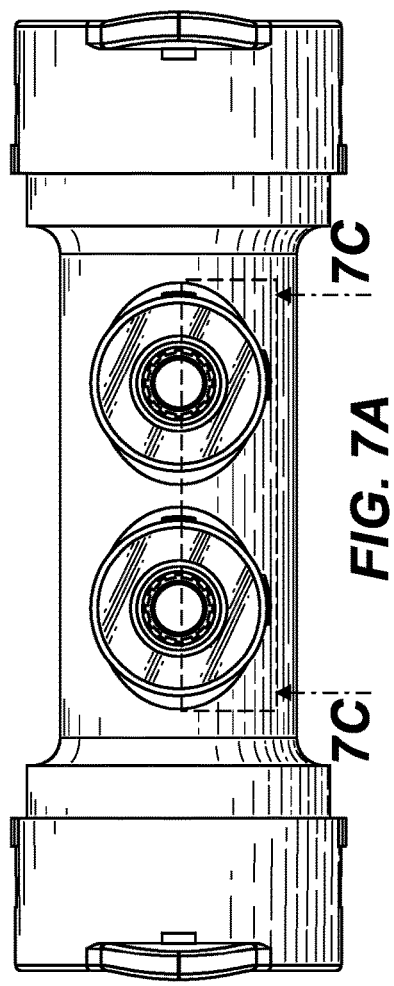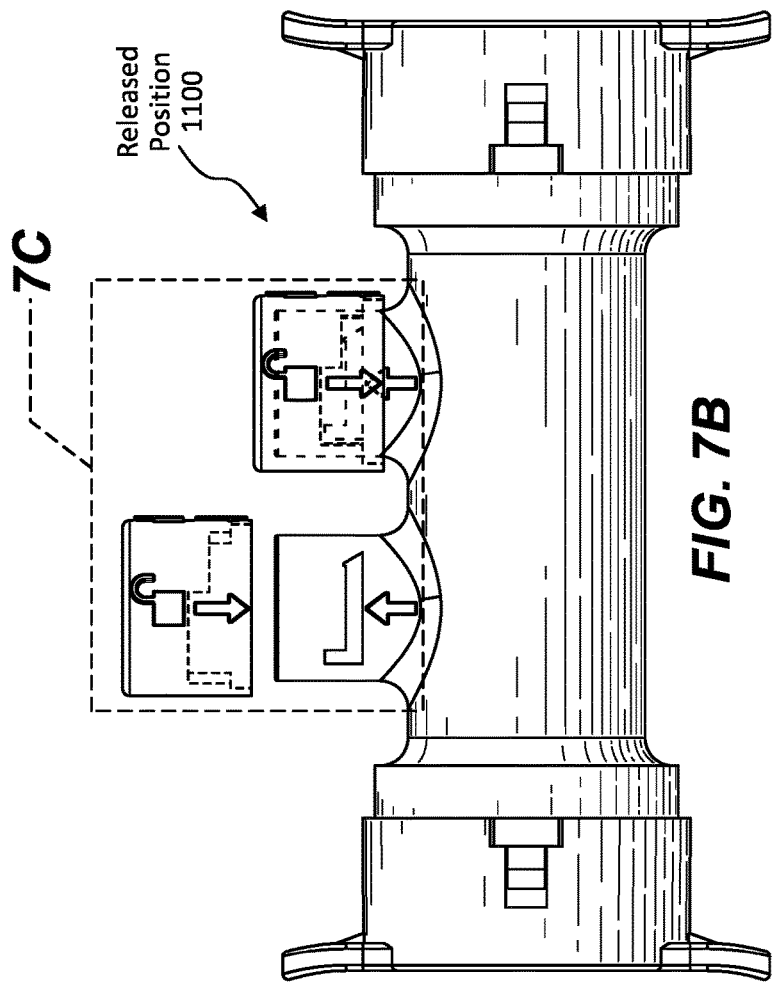

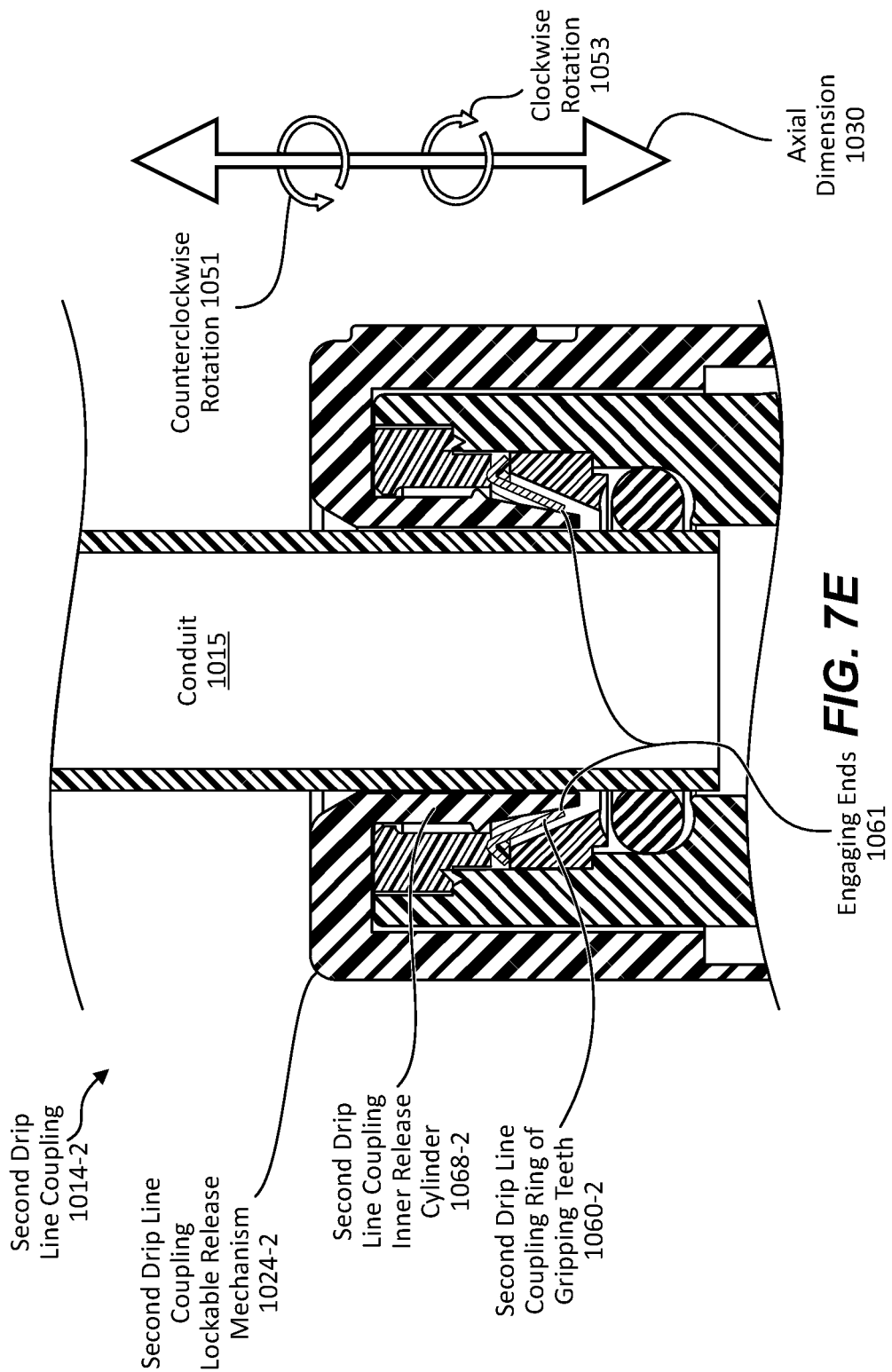

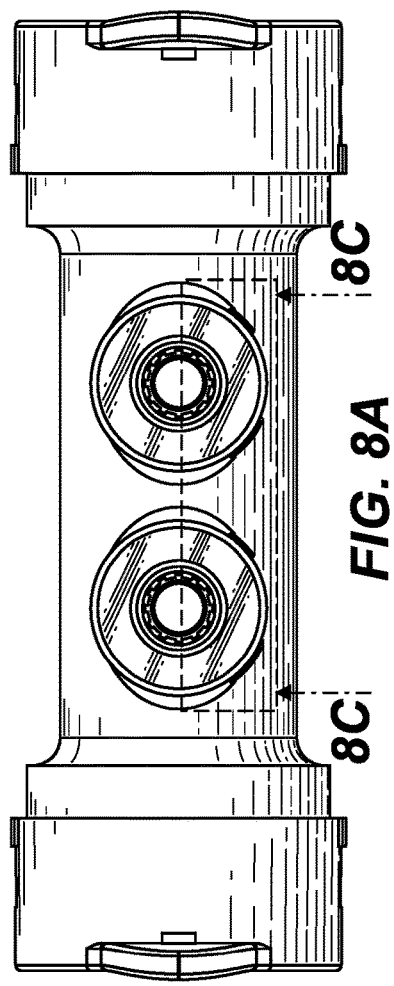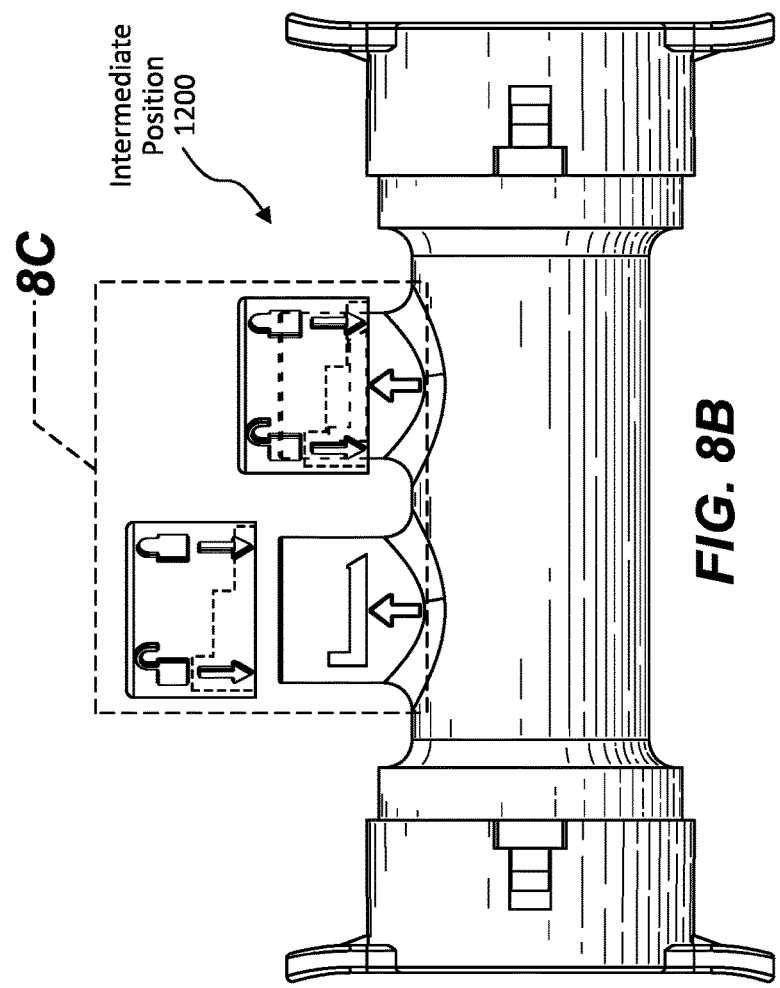

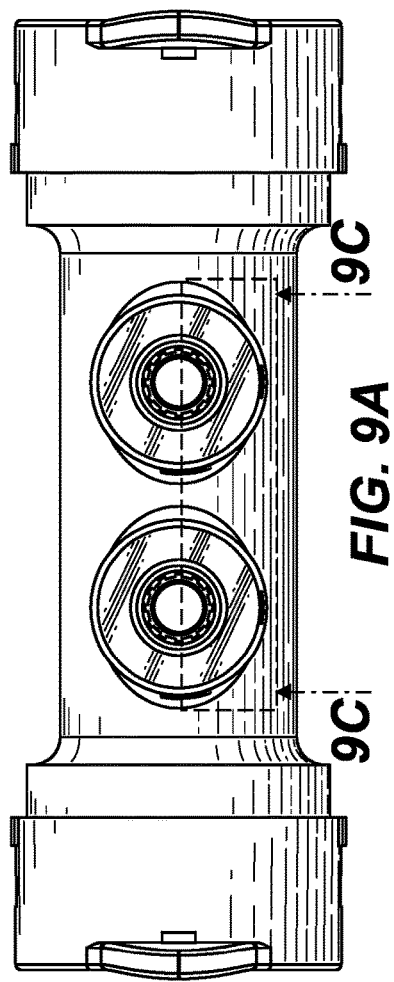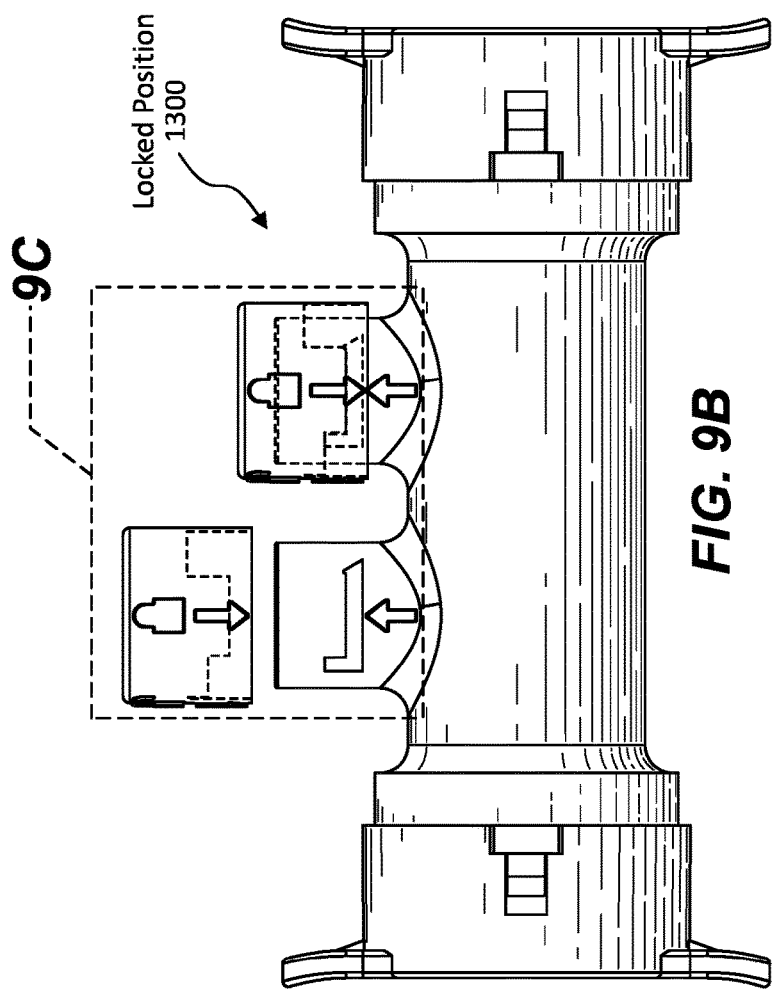

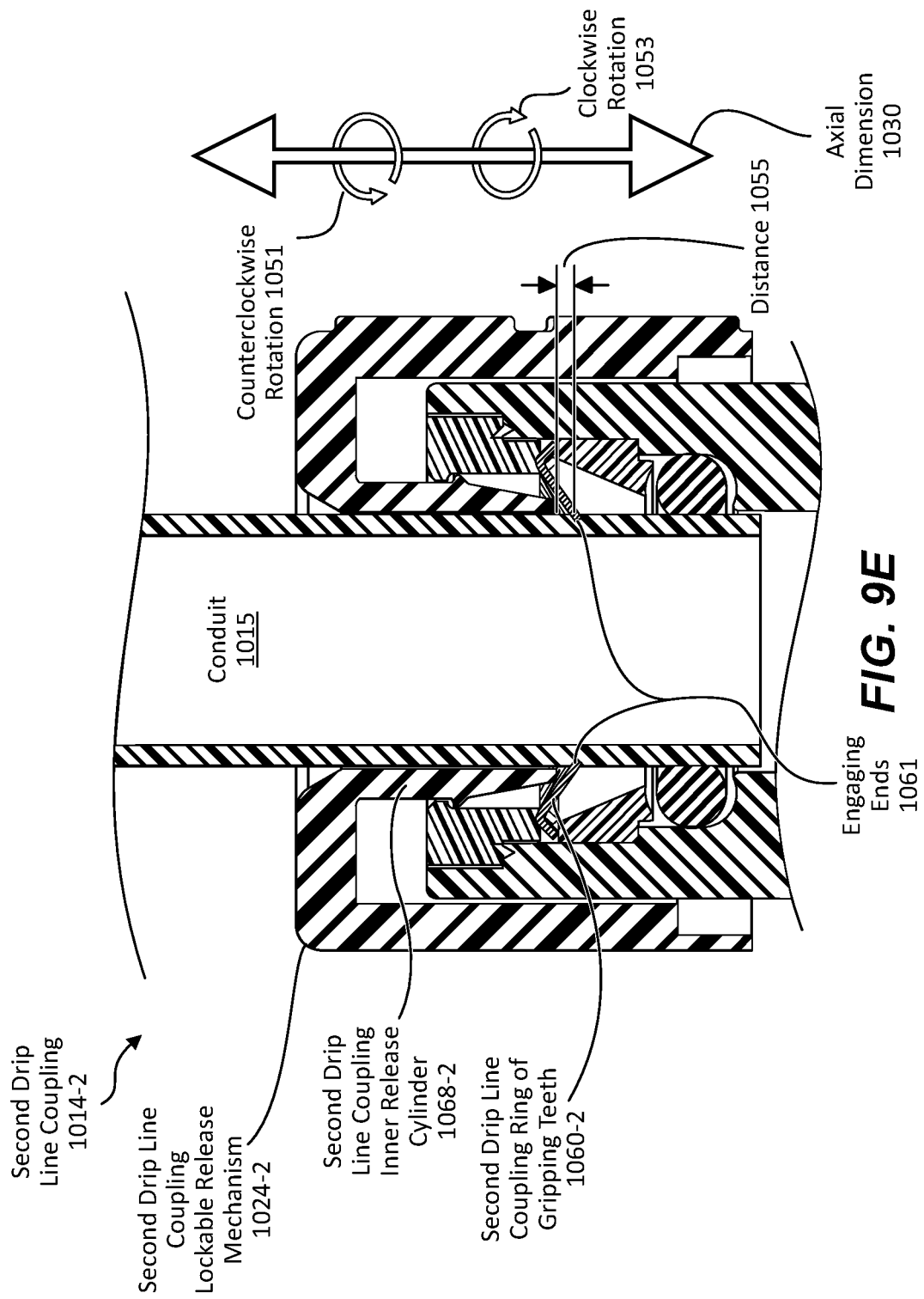

US 11,274,781 B1

IRRIGATION LINE COUPLINGS AND IRRIGATION MANIFOLDS INCLUDING IRRIGATION LINE COUPLINGS

RELATED APPLICATIONS

The present application claims priority to and is a non-provisional application of App. Ser. No. 62/774,221, entitled DRIP MANIFOLD SYSTEMS AND METHODS, filed on Dec. 1, 2018, which is incorporated herein in its entirety by this reference.

TECHNICAL FIELD

The present invention relates generally to irrigation systems. More specifically, the present invention relates to irrigation line couplings and irrigation manifolds including irrigation line couplings.

BACKGROUND

Irrigation sprinklers, including drip irrigation systems, are used to, for example, deliver water to lawn and garden areas. Improvements in the usability, functionality, and manufacturability of irrigation line couplings and irrigation manifolds for delivering irrigation water to multiple locations is desirable.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

FIG. 5A is an exploded side view of the drip manifold shown in FIG. 1;

FIG. 5B is an exploded side, cross-sectional view of the drip manifold of FIG. 5A taken across the line 5B-5B in FIG. 5A;

FIG. 6A-6C comprise various lower perspective views of internal portions comprising ledges of a drip lockable release mechanism of the drip manifold shown in FIG. 1;

FIGS. 6D-6F comprise various elevational perspective views of internal portions comprising ledges of a drip lockable release mechanism of the drip manifold shown in FIG. 6A-6C;

FIG. 7A is a partially exploded, top view of the drip manifold shown in FIG. 1;

FIG. 7B is a partially exploded, side view of the drip manifold of FIG. 1 illustrating a drip line coupling lockable release mechanism in a released position;

FIG. 7E is a simplified cross-sectional view illustrating the interaction between an inner release cylinder and a ring of gripping teeth in the released position, shown together with a conduit;

FIG. 8A is a partially exploded, top view of the drip manifold shown in FIG. 1;

FIG. 8B is a partially exploded, side view of the drip manifold of FIG. 1 illustrating a drip line coupling lockable release mechanism in an intermediate position;

FIG. 9A is a partially exploded, top view of the drip manifold shown in FIG. 1;

FIG. 9B is a partially exploded, side view of the drip manifold of FIG. 1 illustrating a drip line coupling lockable release mechanism in a locked position;

FIG. 9E is a simplified cross-sectional view illustrating the interaction between an inner release cylinder and a ring of gripping teeth in a locked position, shown together with a conduit;

FIG. 13A is an elevated perspective, cross-sectional view of the seal shown in FIG. 13A;

Figure 1:
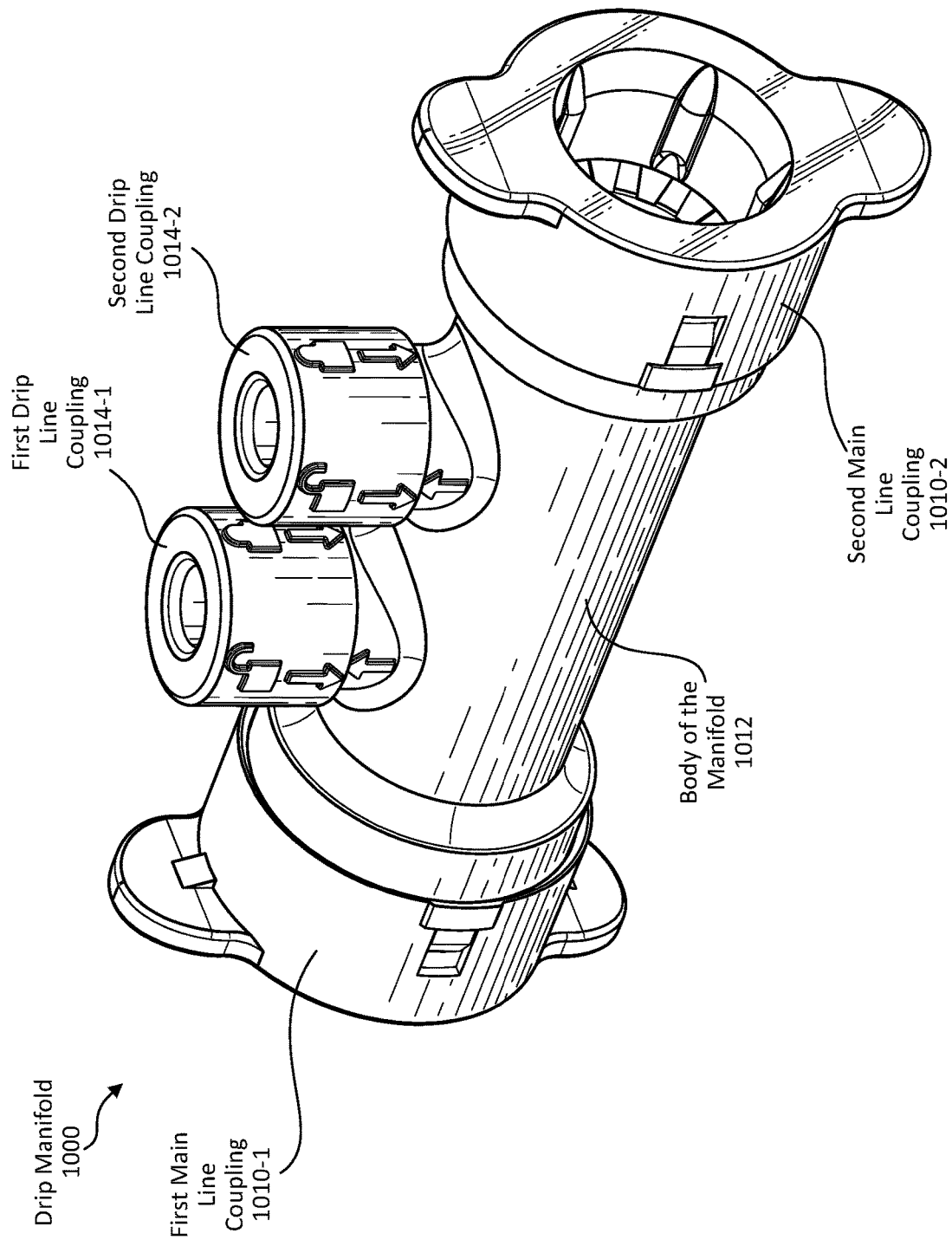
FIG. 1 is an elevated perspective view of one embodiment of a drip manifold.
Figure 2:
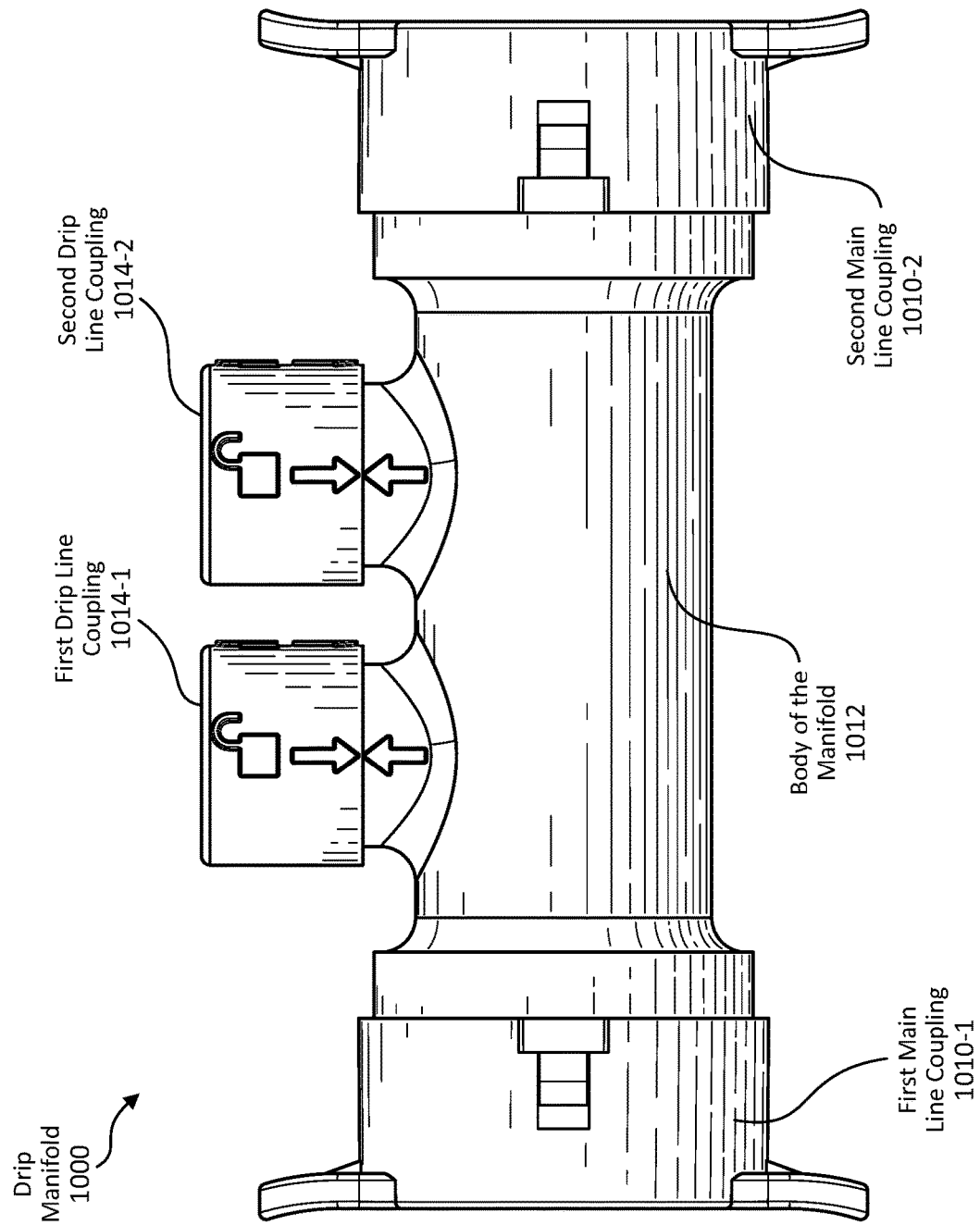
FIG. 2 is a side view of the drip manifold shown in FIG. 1.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

By way of introduction, the following brief definitions are provided for various terms used in this application. Additional definitions will be provided in the context of the discussion of the figures herein. As used herein, "exemplary" can indicate an example, an implementation, and/or an aspect, and should not be construed as limiting or as indicating a preference or a preferred implementation. Further, it is to be appreciated that certain ordinal terms (e.g., "first" or "second") can be provided for identification and ease of reference and may not necessarily imply physical characteristics or ordering. Therefore, as used herein, an ordinal term (e.g., "first," "second," "third") used to modify an element, such as a structure, a component, an operation, etc., does not indicate priority or order of the element with respect to another element (unless explicitly stated otherwise), but rather distinguishes the element from another element having the same name (but for use of the ordinal term). In addition, as used herein, indefinite articles ("a" and "an") can indicate "one or more" rather than "one." As used herein, a structure or operation that "comprises" or "includes" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited. As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter. An enumerated listing of items does not imply that any or all of the items are mutually exclusive and/or mutually inclusive, unless expressly specified otherwise.

Different embodiments disclosed herein will be assigned reference numerals chosen from groups of one thousand. For example, a first embodiment may include numbers within the range 1000-1999, and a second embodiment may include numbers within the range 2000-2999. Identical or similar parts will in the different embodiments include analogous numbers. For example, an arm in a first embodiment may be assigned reference numeral 1024, while a similar or identical arm in the second embodiment will be assigned reference numeral 2024. When an item or component is shown multiple times in a single figure, not all such instances of the item or component will be labeled with a reference numeral to avoid the undue proliferation of reference numerals. Likewise, when multiple figures are discussed as a group, items or components appearing multiple times in the group of figures will generally not all be labeled with reference numerals to avoid the undue proliferation of reference numerals.

When an item or component is present multiple times in a single figure and one or more of the items will be discussed separately, a suffix comprising a hyphen followed by a number (e.g., "-1") may be used to identify individual instances of the item in the figures. For example, a figure may include a first arm 1024-1, a second arm, 1024-2, and third arm 1024-3. All of the arms may be referred to generally as "arms 1024" (without a suffix), while the first arm may be referred to as a "first arm 1024-1."

In this application, the phrases "connected to," "secured to," "coupled to," and "in communication with" refer to any form of interaction between two or more entities, including mechanical, electrical, magnetic, electromagnetic, and thermal interaction and may also include integral formation. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion. The term "integrally formed" refers to a component or item that is manufactured integrally, i.e., as a single piece, without requiring the assembly of multiple pieces. Multiple parts may be integrally formed with each other if they are formed from a single workpiece.

As used in this application, drip line couplings may engage with, for example, drip-type tubing (irrigation tubing including small openings for emitting water along the length of the tubing) or micro tubing (e.g., tubing of a smaller diameter than the main line conduits or tubing). By way of example only, in various embodiments, main line tubing may be ½ inch or ¾ inch tubing, while micro conduit or tubing may be ¼ inch or ⅛ inch tubing. Accordingly, as used in this application, the term "drip line" is not limited to drip-type tubing including small openings for emitting water along the length of the tubing. The drip line or main line tubing may be made, for example, of vinyl or polyethylene.

As used herein, "circumferentially intermediate" indicates that one item is between two other identified items along a circumference.

FIGS. 1-5C

FIGS. 1-5C provide various views of a drip manifold 1000 and will be discussed concurrently. As illustrated in these figures, the drip manifold 1000 may comprise a first main line coupling 1010-1 and a second main line coupling 1010-2 and may include a first drip line coupling 1014-1 and a second drip line coupling 1014-2. In various embodiments, the number of drip line couplings 1014-1, 1014-2 and main line couplings 1010-1, 1010-2 may be varied within the scope of the disclosed subject matter. Also, in embodiments, the drip manifold 1000 may include only a single main line coupling 1010-1, 1010-2 and may have an enclosed end opposite the single main line coupling 1010-1, 1010-2. Alternatively, for example, the body of the drip manifold may be in a Y-shaped configuration employing three main line couplings. As illustrated in these figures, the body of the manifold 1012 is linear in shape. In alternative embodiments, the body of the manifold may include, for example, a 90° or a 60° bend or may be Y-shaped, as mentioned above.

The number of drip line couplings 1014-1, 1014-2 included with the drip manifold 1000 may be varied within the scope of the disclosed subject matter. For example, in various embodiments, only a single or ten drip line couplings are included with the drip manifold 1000.

Figure 11:
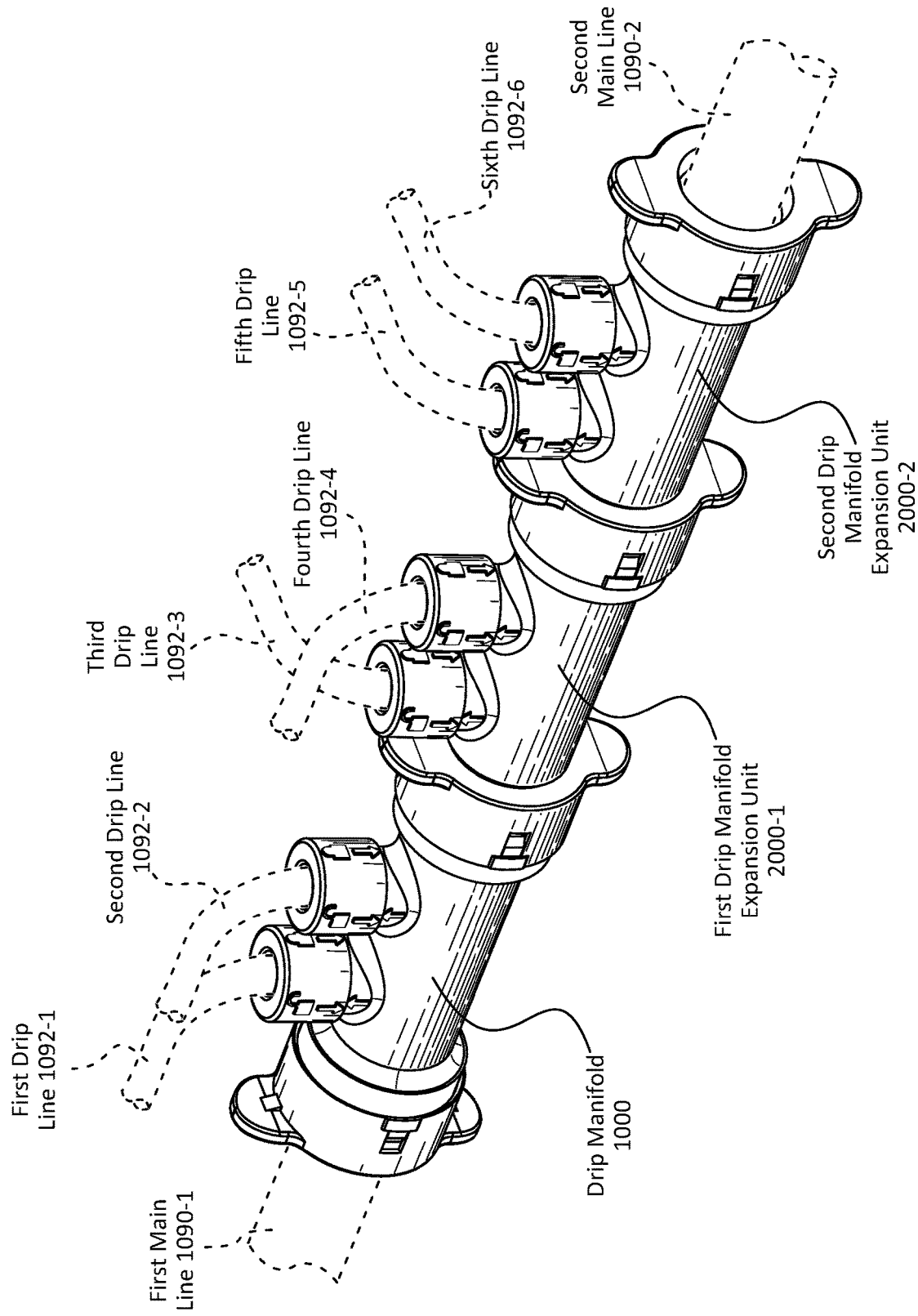
FIG. 11 is an elevated perspective view of multiple drip manifold expansion units of FIG. 10 coupled to the drip manifold of FIG. 1 shown with various broken line representations of main lines and drip lines.

As illustrated, the first and second main line couplings 1010-1, 1010-2 are designed for receiving a pressurized fluid from a main line 1090-1, 1090-2 (illustrated in FIG. 11) which may optionally be larger in diameter than a drip line 1092-1, 1092-2, 1092-3, 1092-4, 1092-5, 1092-6 (illustrated in FIG. 11). One or more drip lines 1092-1, 1092-2, 1092-3, 1092-4, 1092-5, 1092-6 may be coupled to the first and second drip line couplings 1014-1, 1014-2.

Figures 3A, 3B:
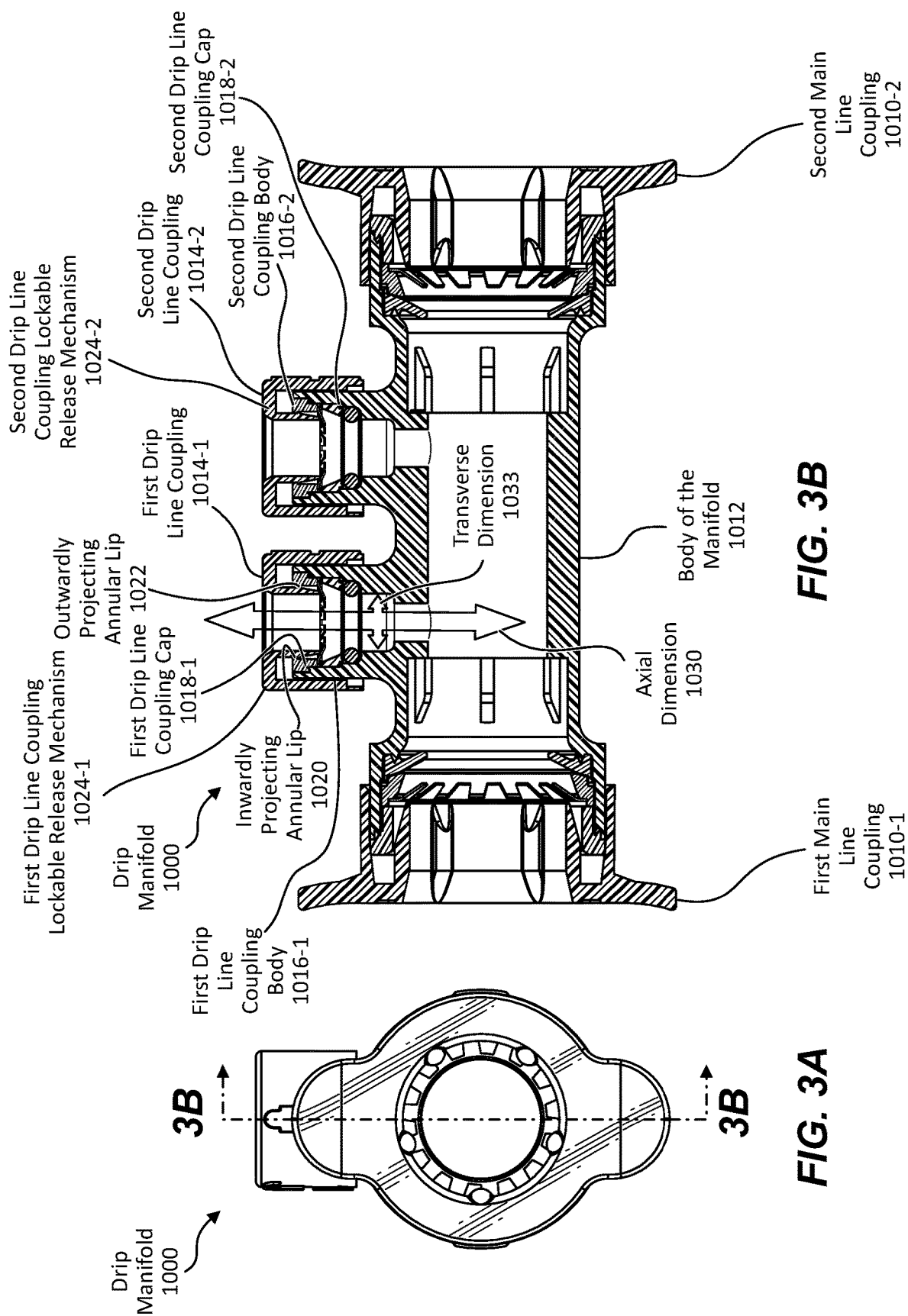
FIG. 3A is a side view of the drip manifold shown in FIG. 1.
FIG. 3B comprises a side, cross-sectional view of the drip manifold of FIG. 3A taken across the line 3B-3B in FIG. 3A.

With specific reference to FIG. 3B, each drip line coupling 1014-1, 1014-2 comprises a drip line coupling lockable release mechanism 1024-1, 1024-2. Each drip line coupling body 1016-1, 1016-2 (sometimes referred to as a "coupling body") may comprise an axial dimension 1030 and a transverse dimension 1033, as illustrated in FIG. 3B. Each drip line coupling lockable release mechanism 1024-1, 1024-2 may rotate with respect to and move along an axial dimension 1030 of a drip line coupling body 1016-1, 1016-2. Each drip line coupling lockable release mechanism 1024-1, 1024-2 (sometimes referred to as a "lockable release mechanism") is in rotatable engagement with the drip line coupling body 1016-1, 1016-2 employing an inwardly projecting annular lip 1020 on a drip line coupling cap 1018-1, 1018-2 and an outwardly projecting annular lip 1022 on the drip line coupling lockable release mechanism 1024-1, 1024-2. As discussed below, rotation of the drip line coupling lockable release mechanism 1024-1, 1024-2 may be limited, i.e., 360° rotation is not permissible in certain embodiments.

Each of the first and second main line couplings 1010-1, 1010-2 may comprise a first and second main line coupling release mechanism 1028-1, 1028-2, a main line coupling cap 1035-1, 1035-2, a main line coupling ring of gripping teeth 1032-1, 1032-2, a main line coupling support ring 1034-1, 1034-2, and a main line coupling seal 1026-1, 1026-2. The main line coupling seal 1026-1, 1026-2 may engage with and seal to a conduit (e.g., a main line) disposed within the pertinent main line coupling 1010-1, 1010-2. The main line coupling seal 1026-1, 1026-2 comprises a radially inward disposed lip 1052-1, 1052-2 that enables the main line coupling seal 1026-1, 1026-2 to engage with conduits of various sizes. The main line coupling support ring 1034-1, 1034-2 supports the main line coupling ring of gripping teeth 1032-1, 1032-2.

The main line coupling cap 1035-1, 1035-2 engages with the body of the manifold 1012 and may, for example, be adhered to the body of the manifold 1012 using various securing mechanisms or techniques, including, but not limited to, adhesives, sonic welding, and/or spin welding. The main line coupling cap 1035-1, 1035-2 retains the main line coupling ring of gripping teeth 1032-1, 1032-2, the main line coupling support ring 1034-1, 1034-2, and the main line coupling seal 1026-1, 1026-2 within the main line coupling assembly recess 1038-1, 1038-2.

The main line coupling ring of gripping teeth 1032-1, 1032-2 engage and retain a conduit within the pertinent main line coupling 1010-1, 1010-2. The main line coupling release mechanism 1028-1, 1028-2 is movable with respect to the body of the drip manifold 1012 along the axial dimension 1030 such that a main line coupling inner release cylinder 1036-1, 1036-2 may be pressed toward the body of the drip manifold 1012 and thereby dislodge the ring of gripping teeth 1032-1, 1032-2 from a conduit disposed in the main line coupling 1010-1, 1010-2, such that the conduit may be removed from the main line coupling 1010-1, 1010-2. The inner release cylinder 1036-1, 1036-2 may be generally cylindrical in shape and may be formed of a unitary piece or a plurality of pieces with optional gaps between the plurality of pieces (e.g., the inner release cylinder 1036-1, 1036-2 may comprise a series of elongate planar members around the perimeter of the cylindrical shape). The inner release cylinder 1036-1, 1036-2 may be surrounded by an outer wall 1069-1, 1069-2.

Each of the drip line conduit couplings 1014-1, 1014-2 may include a drip line coupling cap 1018-1, 1018-2, a drip line coupling ring of gripping teeth 1060-1, 1060-2 (including engaging ends 1061, which comprise the ends of the teeth that engage a conduit), a drip line coupling support ring 1062-1, 1062-2, and a drip line coupling seal 1064-1, 1064-2 (e.g., an O-ring seal). These components may be secured within a drip line coupling assembly recess 1066-1, 1066-2 using the drip line coupling cap 1018-1, 1018-2. The drip line coupling cap 1018-1, 1018-2 may be adhered to the drip line coupling body 1016-1, 1016-2 using various techniques, such as adhesives, sonic welding, and spin welding. The drip line coupling ring of gripping teeth 1060-1, 1060-2 may sometimes be referred to as a "ring of gripping teeth" 1060-1, 1060-2.

The drip line coupling support ring 1062-1, 1062-2 supports the drip line coupling ring of gripping teeth 1060-1, 1060-2. The drip line coupling seal 1064-1, 1064-2 engages and seals a drip line disposed within the pertinent drip line coupling 1014-1, 1014-2.

The drip line coupling lockable release mechanism 1024-1, 1024-2 may be employed to release a conduit (e.g., a drip line) secured by the drip line coupling ring of gripping teeth 1060-1, 1060-2 using the drip line coupling inner release cylinder 1068-1, 1068-2, which may be generally cylindrical in shape. The drip line coupling lockable release mechanism 1024-1, 1024-2 may be pressed toward the body of the drip manifold 1012 to dislodge the drip line coupling ring of gripping teeth 1060-1, 1060-2 from an engaged conduit, thereby enabling the engaged conduit to be removed from the drip manifold 1000.

The drip line coupling lockable release mechanism 1024-1, 1024-2 may include a series of inwardly disposed ledges comprising a shallow ledge 1104-1 (which defines a shallow recess 1072-1), an intermediate ledge 1106-1 (which defines an intermediate recess 1076-1), and a deep ledge 1110-1 (which defines a deep recess 1080-1). The drip line coupling lockable release mechanism 1024-1, 1024-2 will be discussed further in connection with subsequent figures. The ledges 1104-1, 1106-1, 1110-1 may be integrally formed or separately manufactured from the outer wall 1069-1, 1069-2 and/or inner release cylinder 1068-1, 1068-2.

Each of the main line couplings and the drip line couplings enable insertion and removal of conduits (e.g., a main line conduit or a drip line conduit) without the use of adhesives or unique structures on the conduits (e.g., the conduits may have a generally smooth outer surface devoid of beads, ribs, or ridges) for engaging with the couplings. In addition, the body of the manifold 1012 may include centering inward protrusions 1057.

The components of the main line couplings 1010-1, 1010-2 and the drip line couplings 1014-1, 1014-2 shown in these figures are merely illustrative. Those skilled in the art will recognize that, based on the disclosure provided herein, the precise form and features of the components of these couplings may be varied. For example, a release mechanism make may be distributed separately, i.e., the release mechanism is not attached or secured in any way to the drip manifold 1000. Also, for example, the precise configuration of the ring of gripping teeth may be varied as well.

Figure 4:
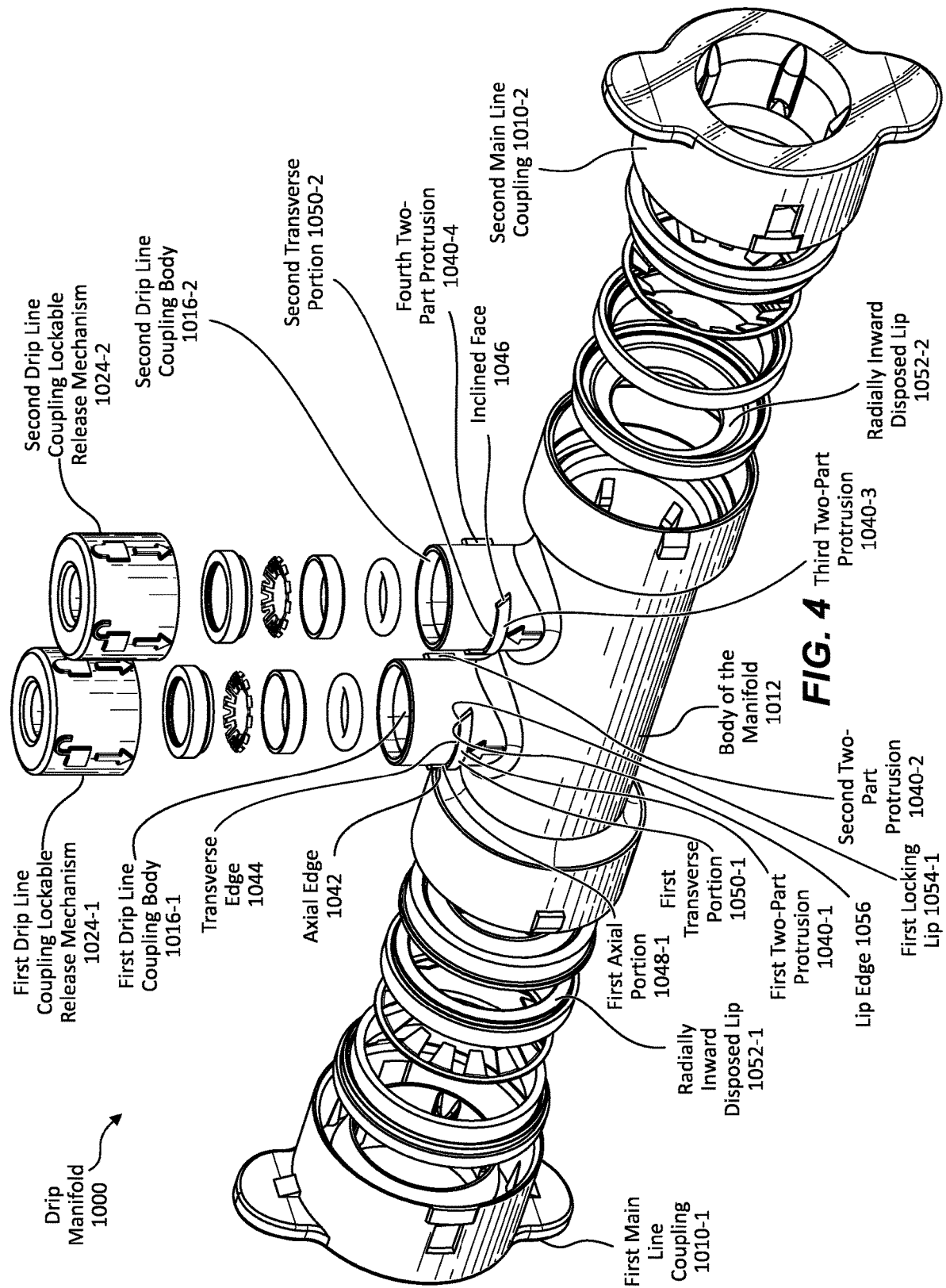
FIG. 4 is an exploded perspective view of the drip manifold shown in FIG. 1.
Figure 5C:
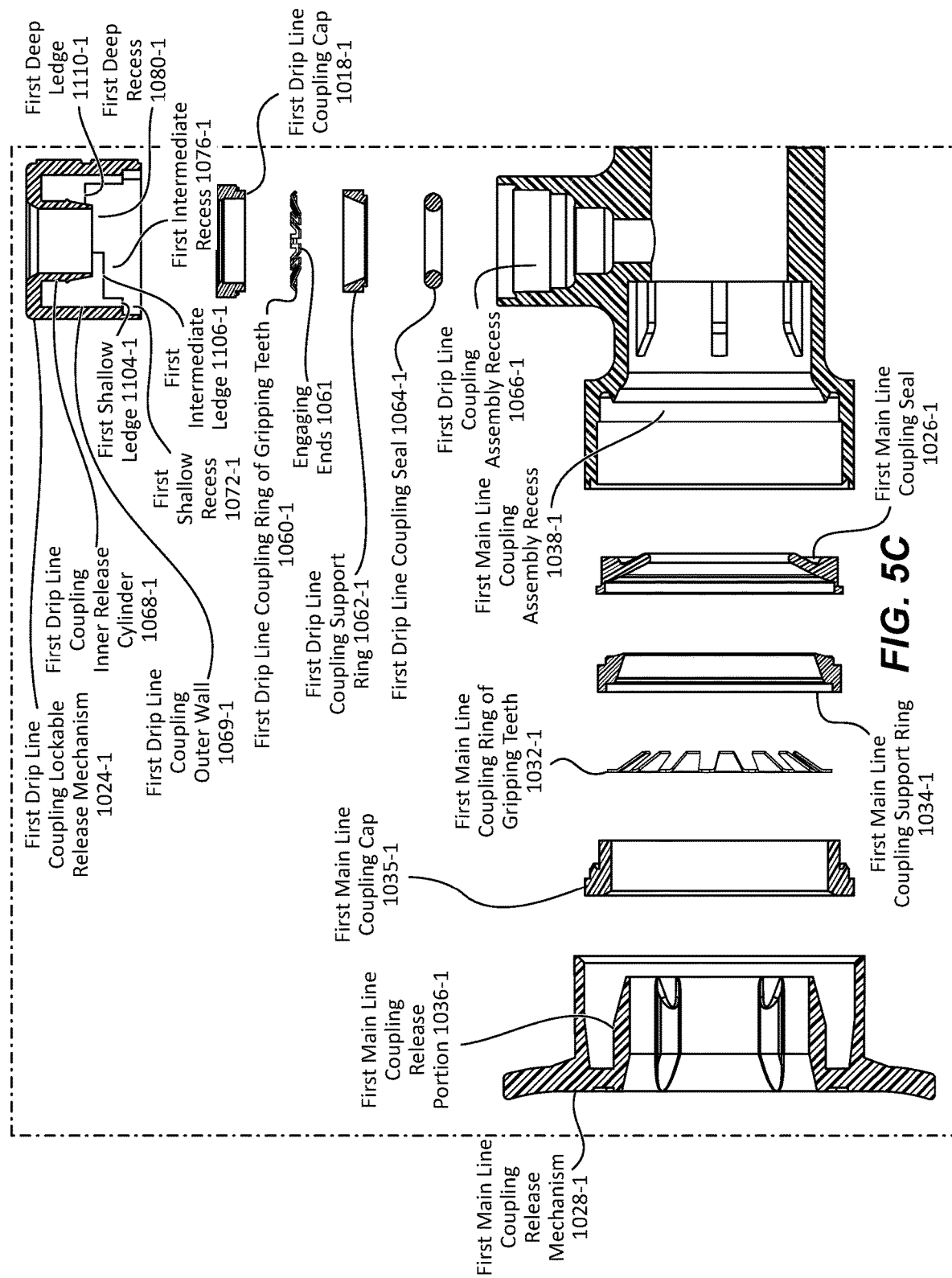
FIG. 5C is an exploded side, cross-sectional enlarged view of region 5C of FIG. 5B.

With specific reference to FIG. 4, each of the drip line coupling bodies 1016-1, 1016-2 may include a two-part protrusion 1040-1, 1040-2, 1040-3, 1040-4. The two-part protrusions 1040-1, 1040-2, 1040-3, 1040-4 engage with the drip line coupling lockable release mechanism 1024-1, 1024-2, as will be explained subsequently. As illustrated in FIG. 4, each drip line coupling body 1016-1, 1016-2 may comprise a pair of two-part protrusions 1040-1, 1040-2, 1040-3, 1040-4 disposed on opposite sides of the drip line coupling body 1016-1, 1016-2. Each two-part protrusion 1040-1, 1040-2, 1040-3, 1040-4 includes an axial portion 1048-1 generally parallel to an axial dimension 1030 of the drip line coupling body 1016-1, 1016-2, a transverse portion 1050-1, 1050-2 generally perpendicular to the axial portion 1048-1, and a locking lip 1054-1. The axial portion 1048-1 comprises an axial edge 1042, the transverse portion 1050-1, 1050-2 comprises a transverse edge 1044 and an inclined face 1046 and the locking lip 1054-1 comprises a lip edge 1056. As used herein the term "generally perpendicular," in various embodiments, signifies within plus or minus 15° of being perfectly perpendicular. As used herein the term "generally parallel," in various embodiments, signifies within plus or minus 15° of being perfectly parallel. In addition, when an item is "extending along" a particular dimension, in various embodiments, this signifies that the item is within 15° of extending perfectly along the identified dimension. It should also be noted that the number of two-part protrusions 1040-1, 1040-2, 1040-3, 1040-4 on each drip line coupling body 1016-1, 1016-2 may be varied within the scope of the disclosed subject matter. For example, in alternative variations, each drip line coupling body 1016-1, 1016-2 may include one, three, or four two-part protrusions 1040-1, 1040-2, 1040-3, 1040-4.

As indicated in FIGS. 1-5C, each of the first main line coupling 1010-1, second main line coupling 1010-2, body of the manifold 1012, first drip line coupling 1014-1, and second drip line coupling 1014-2 are in fluid communication with one another.

FIGS. 6A-6F

Referring now to FIGS. 6A-6F, various views of internal portions of the drip line coupling lockable release mechanism 1024-1, 1024-2 are provided with an outer wall 1069-1, 1069-2 of the drip line coupling lockable release mechanism 1024-1, 1024-2 omitted for illustrative purposes. The outer wall 1069-1, 1069-2 of the drip line coupling lockable release mechanism 1024-1, 1024-2 may be integrally formed or may be formed separately and secured or coupled to the internal portions of the drip line coupling lockable release mechanism 1024-1, 1024-2.

As indicated above, each drip line coupling lockable release mechanism 1024-1, 1024-2 comprises a series of inwardly disposed ledges 1104-1, 1104-2, 1106-1, 1106-2, 1110-1, 1110-2. In various embodiments, the ledges 1104-1, 1104-2, 1106-1, 1106-2, 1110-1, 1110-2 on each drip line coupling 1014-1, 1014-2 may comprise a first and a second shallow ledge 1104-1, 1104-2 (each of which define a shallow recess 1072-1, 1072-2), a first and a second intermediate ledge 1106-1, 1106-2 (each of which define an intermediate recess 1076-1, 1076-2), and a first and a second deep ledge 1110-1, 1110-2 (each of which define a deep recess 1080-1, 1080-2) and a first and second intermediate ledge stop 1112-1, 1112-2. A released position stop 1102-1, 1102-2 is positioned circumferentially intermediate each adjacent shallow ledge 1104-1, 1104-2 and deep ledge 1110-1, 1110-2. A locked position stop 1108-1, 1108-2 is positioned circumferentially intermediate each adjacent intermediate ledge 1106-1, 1106-2 and shallow ledge 1104-1, 1104-2. The released and locked position stops 1102-1, 1102-2, 1108-1, 1108-2 limit rotation of each drip line coupling lockable release mechanism 1024-1, 1024-2 with respect to a coupled drip line coupling body 1016-1, 1016-2.

It should be noted that, as illustrated in FIGS. 6A-6F, each set of ledges 1110-1, 1106-1, 1104-1 (i.e., a deep ledge 1110-1, an intermediate ledge 1106-1, and a shallow ledge 1104-1) is identical or similar but rotated a certain number of degrees (i.e., rotation about a central point by 180 degrees) with respect to another set of ledges 1110-2, 1106-2, 1104-2 to allow simultaneous engaging of, for example, both two-part protrusions 1040-1, 1040-2 on a single drip line coupling body 1016-1, 1016-2 in a locked position 1300, a released position 1100, and an intermediate position 1200. This simultaneous engagement allows the drip line coupling lockable release mechanism 1024-1, 1024-2 to be more securely retained in each position. It should also be noted that the number of ledges 1104-1, 1104-2, 1106-1, 1106-2, 1110-1, 1110-2 and two-part protrusions 1040-1, 1040-2, 1040-3, 1040-4 may be varied within the scope of the disclosed subject matter, to allow for, simultaneous engaging of, for example, one or more two-part protrusions 1040-1, 1040-2, 1040-3, 1040-4 per drip line coupling body 1016-1, 1016-2. In various embodiments, there is a 3-to-1 ratio of ledges 1104-1, 1104-2, 1106-1, 1106-2, 1110-1, 1110-2 to two-part protrusions 1040-1, 1040-2, 1040-3, 1040-4. Of course, other ratios may be implemented within the scope of the disclosed subject matter.

Each of the ledges 1104-1, 1104-2, 1106-1, 1106-2, 1110-1, 1110-2 may comprise opposing ends 1105, only a few of which are labeled in FIG. 6A-6D to avoid the undue proliferation of reference numerals.

Each of the stops 1102-1, 1102-2, 1108-1, 1108-2 disclosed herein may comprise, for example, an edge, protuberance or other shape that engages with a two-part protrusion 1040-1, 1040-2, 1040-3, 1040-4 and limits movement of a lockable release mechanism 1024-1, 1024-2 with respect to a coupling body 1016-1, 1016-2.

FIG. 7A-7E

Figure 7C:
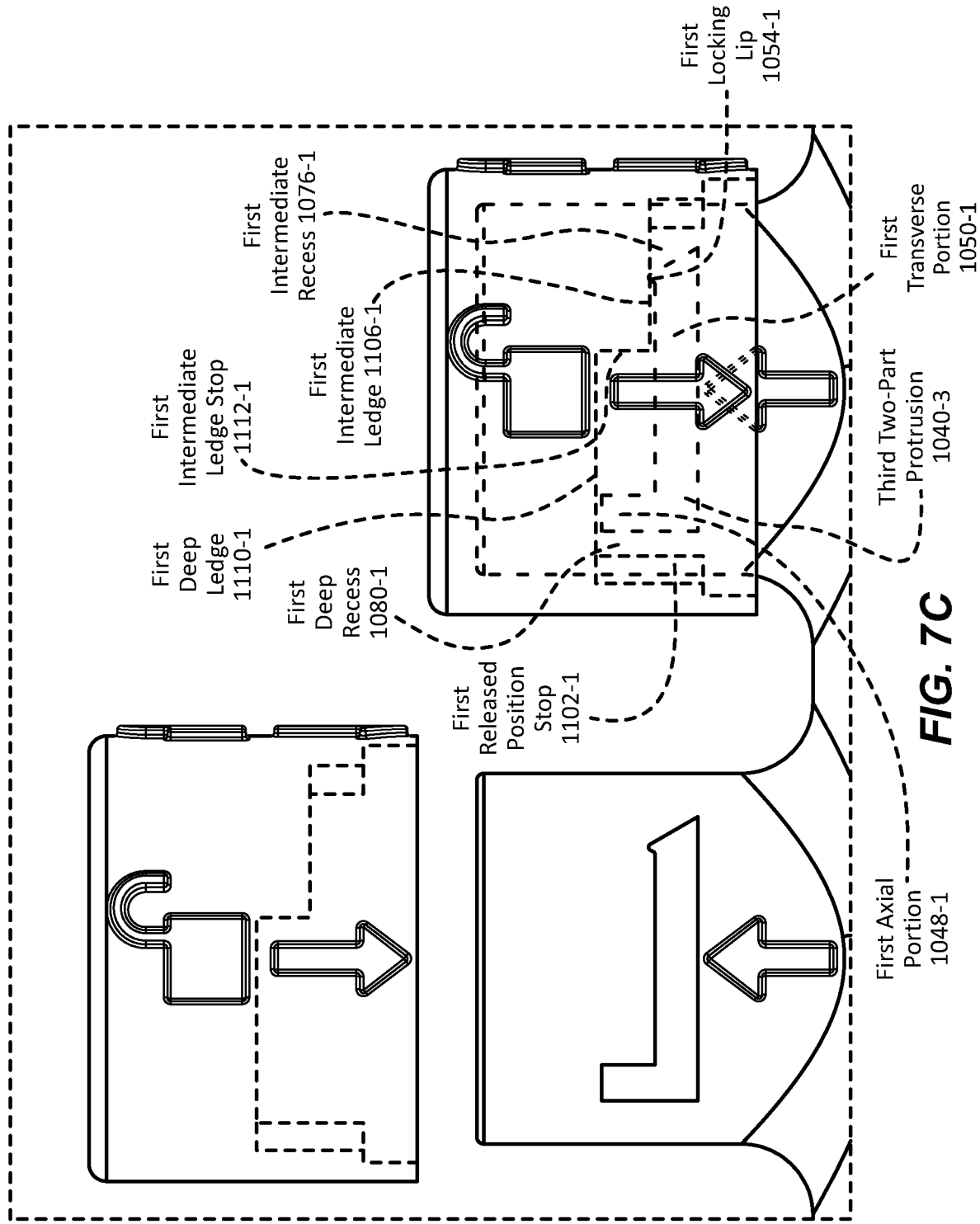
FIG. 7C is an enlarged view of region 7C identified in FIGS. 7A-7B.
Figure 7D:
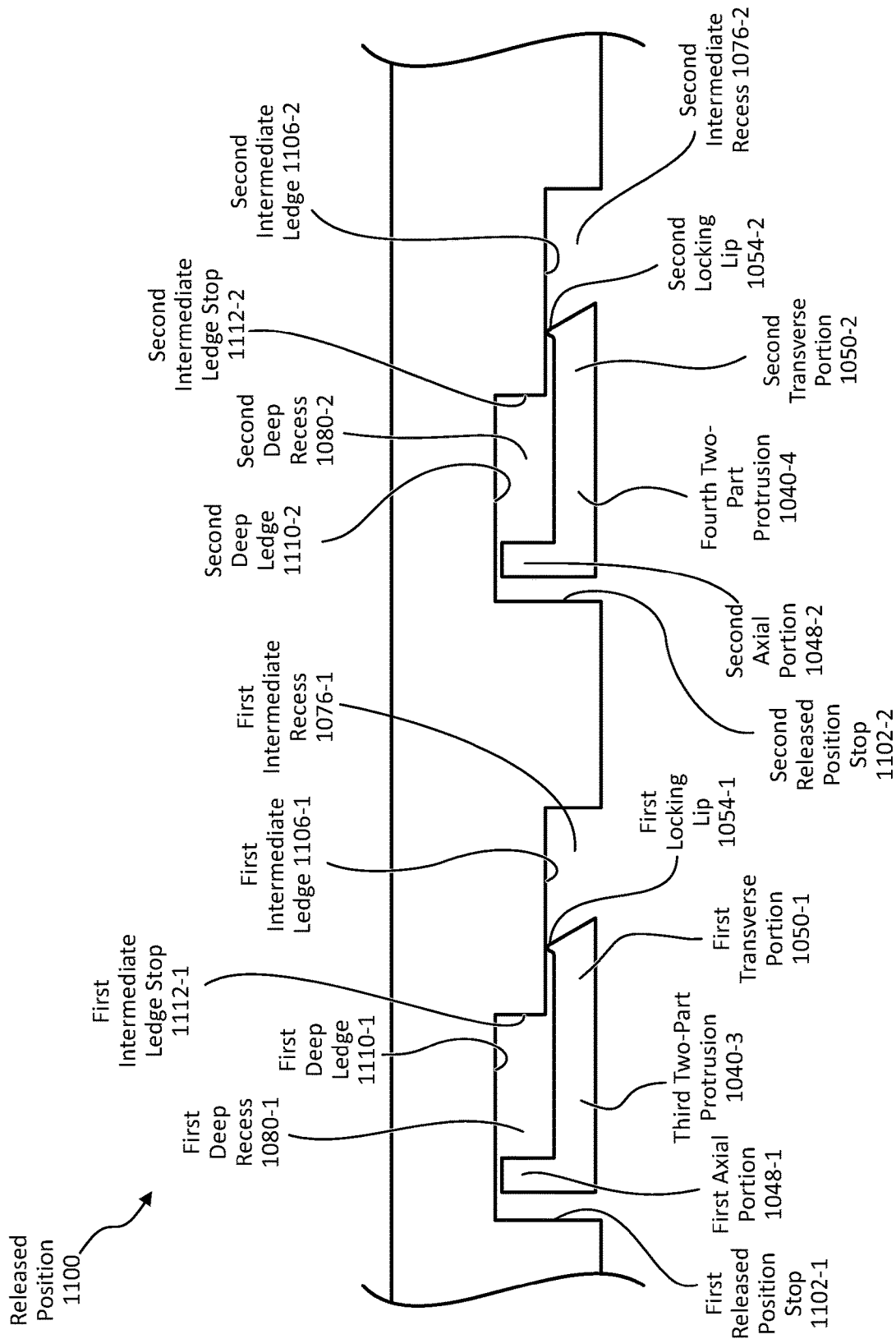
FIG. 7D is a simplified, flattened view of ledges and two two-part protrusions of a coupling of FIG. 1 in a released position.

FIGS. 7A-7E illustrate each drip line coupling lockable release mechanism 1024-1, 1024-2 in a released position 1100. In FIG. 7A-7C, a first drip line coupling lockable release mechanism 1024-1 is shown in an exploded view—separated from the first drip line coupling body 1016-1—while a second drip line coupling lockable release mechanism 1024-2 is shown disposed on the drip line coupling body 1016-2 in the released position 1100. FIG. 7D is a simplified, flattened view of the ledges 1104-1, 1104-2, 1106-1, 1106-2, 1110-1, 1110-2 and two-part protrusions 1040-3, 1040-4 of a drip line coupling 1014-2 of FIG. 1 in a released position 1100. FIG. 7E is a simplified cross-sectional view illustrating the relative position of an inner release cylinder 1068-2 relative to a ring of gripping teeth 1060-2 in the released position 1100, shown together with a conduit 1015.

In the released position 1100, the axial portion 1048-1, 1048-2 of each two-part protrusion 1040-1, 1040-2 is disposed within the deep recess 1080-1, 1080-2 formed by each deep ledge 1110-1, 1110-2. The transverse portion 1050-1, 1050-2 of each two-part protrusion 1040-1, 1040-2 is disposed within each corresponding deep recess 1080-1, 1080-2 and intermediate recess 1076-1, 1076-2. As illustrated, each locking lip 1054-1, 1054-2 may abut a corresponding intermediate ledge 1106-1, 1106-2 and may be disposed within the corresponding intermediate recess 1076-1, 1076-2. In the released position 1100, the drip line coupling lockable release mechanism 1024-2 may be positioned and moved along the axial dimension 1030 within a drip line coupling body 1016-2 toward the body of the drip manifold 1012 such that the drip line coupling inner release cylinder 1068-2 may be interposed and dislodge the engaging ends 1061 of the drip line coupling ring of gripping teeth 1060-2 from a coupled conduit 1015, as illustrated in FIG. 7E. Please note that in the illustrated embodiment, each released position stop 1102-1, 1102-2 limits rotation of the drip line coupling lockable release mechanism 1024-1, 1024-2 in a counterclockwise direction 1051 when the two-part protrusion 1040-3, 1040-4 abuts the released position stop 1102-1, 1102-2. In alternative embodiments, the ledges 1104-1, 1104-2, 1106-1, 1106-2, 1110-1, 1110-2 could be arranged in a reverse order such that each released position stop 1102-1, 1102-2 limits rotation of the drip line coupling lockable release mechanism 1024-2 in a clockwise direction 1053 when the two-part protrusion 1040-3, 1040-4 abuts the released position stop 1102-1, 1102-2.

FIGS. 8A-8E

Figure 8C:
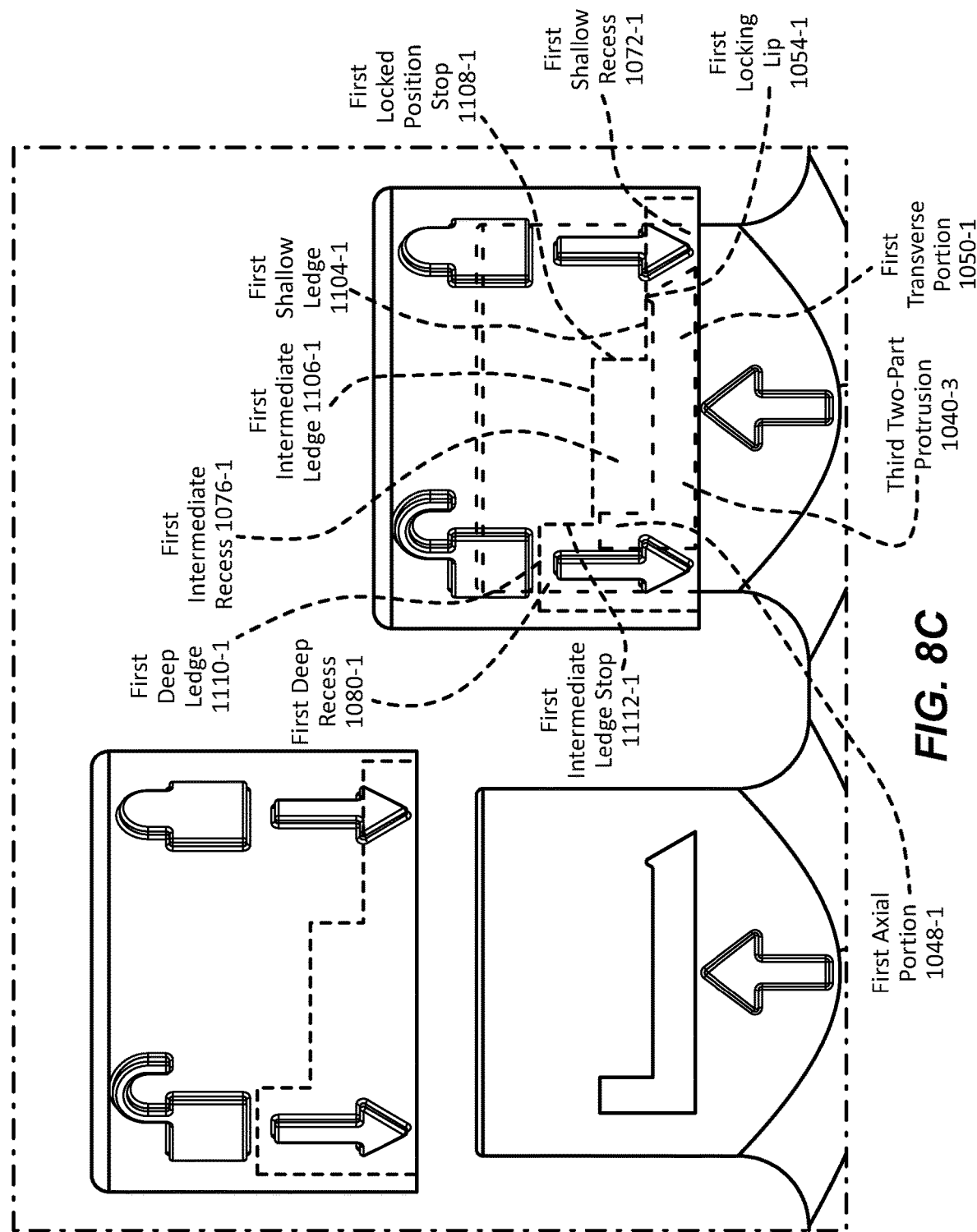
FIG. 8C is an enlarged view of region 8C identified in FIGS. 8A-8B.
Figure 8D:
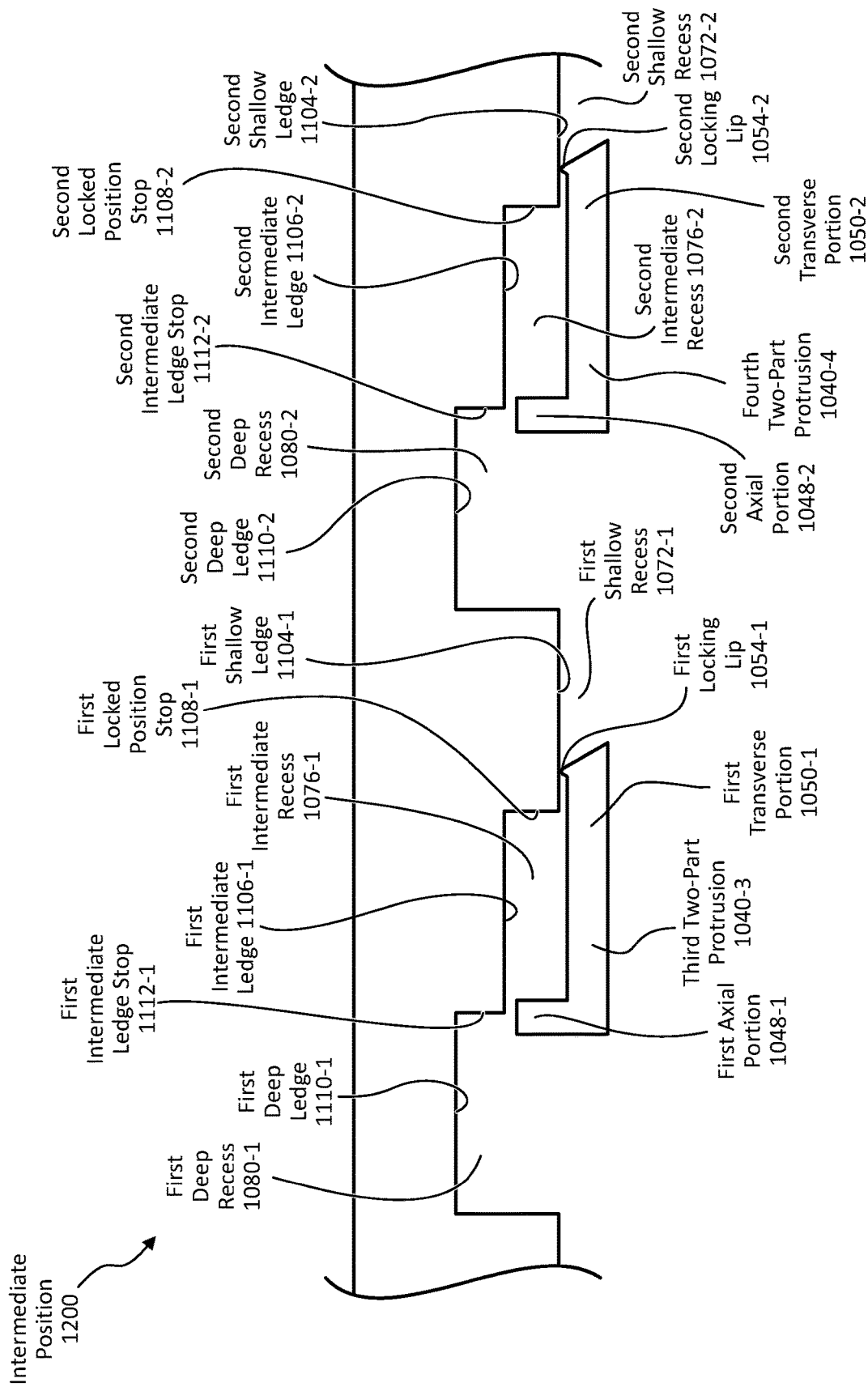
FIG. 8D is a simplified, flattened view of ledges and two two-part protrusions of a coupling of FIG. 1 in an intermediate position.
Figure 8E:
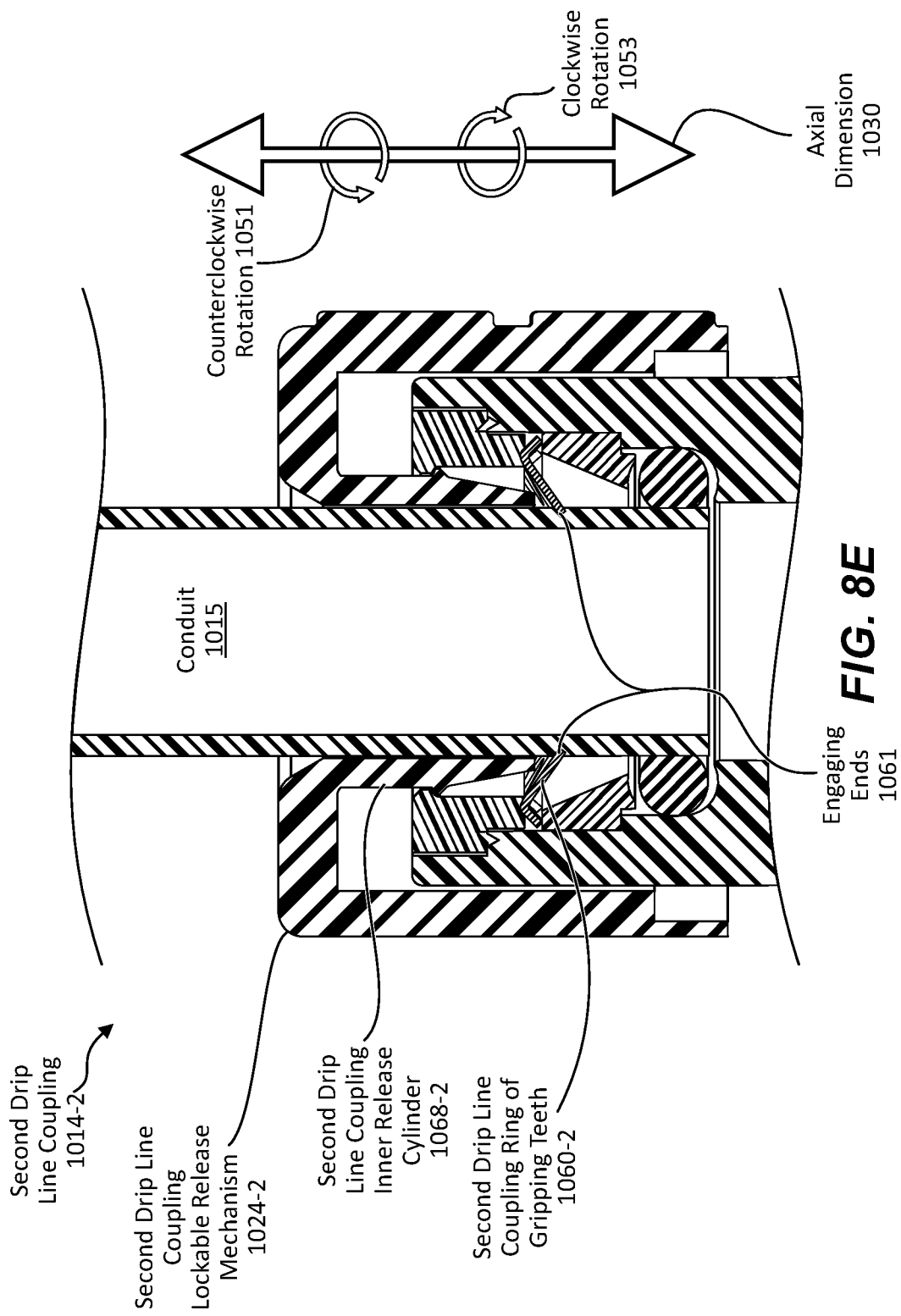
FIG. 8E is a simplified cross-sectional view illustrating the interaction between an inner release cylinder and a ring of gripping teeth in an intermediate position, shown together with a conduit.

FIGS. 8A-8E illustrate each drip line coupling lockable release mechanism 1024-1, 1024-2 in an intermediate position 1200-a position intermediate a released position 1100 and a locked position 1300. In FIGS. 8A-8C, the first drip line coupling lockable release mechanism 1024-1 is shown in an exploded view-separated from the first drip line coupling body 1016-1—while the second drip line coupling lockable release mechanism 1024-2 is shown disposed on the second drip line coupling body 1016-2 in the intermediate position 1200. FIG. 8D is a simplified, flattened view of the ledges 1104-1, 1104-2, 1106-1, 1106-2, 1110-1, 1110-2 and two two-part protrusions 1040-3, 1040-4 of a drip line coupling 1014-2 of FIG. 1 in an intermediate position 1200. FIG. 8E is a simplified cross-sectional view illustrating the relative position of an inner release cylinder 1068-1 relative to a ring of gripping teeth 1060-1 in an intermediate position 1200, shown together with a conduit 1015.

In the illustrated intermediate position 1200, the axial portion 1048-1, 1048-2 of each two-part protrusion 1040-1, 1040-2 is disposed within a deep recess 1080-1, 1080-2 formed by each deep ledge 1110-1, 1110-2 and the intermediate recess 1076-1, 1076-2 formed by each intermediate ledge 1106-1, 1106-2. A transverse portion 1050-1, 1050-2 of each two-part protrusion 1040-1, 1040-2 is disposed within a corresponding deep recess 1080-1, 1080-2, intermediate recess 1076-1, 1076-2 and shallow recess 1072-1, 1072-2. As illustrated, each locking lip 1054-1, 1054-2 is disposed within a corresponding shallow recess 1072-1, 1072-2 and abuts or is proximate the shallow ledge 1104-1, 1104-2. In the illustrated intermediate position 1200, movement of the drip line coupling lockable release mechanism 1024-2 along the axial dimension 1030 toward the body of the drip manifold 1012 is limited because of contact between the shallow ledge 1104-1, 1104-2 and the locking lip 1054-1, 1054-2, and the drip line inner release cylinder 1068-2 is not disposed between the engaging ends 1061 of the drip line coupling ring of gripping teeth 1060-2 and a coupled conduit 1015 (i.e., the drip line inner release cylinder 1068-2 is not radially inward with respect to the engaging ends 1061 of the drip line ring of gripping teeth 1060-2), as illustrated in FIG. 8C-8E. In the intermediate position 1200, each axial portion 1048-1, 1048-2 may be positioned at various locations within the intermediate recesses 1076-1, 1076-2 until the two-part protrusions 1040-3, 1040-4 are positioned within a corresponding locked position 1300, as discussed below in connection with FIGS. 9A-9E. When moving from the released position 1100 to the intermediate position 1200, the drip line coupling lockable release mechanism 1024-2 is rotated in a clockwise direction 1053. It should be noted that the ledges 1104-1, 1104-2, 1106-1, 1106-2, 1110-1, 1110-2 could be configured in a reverse order such that movement of the drip line coupling lockable release mechanism 1024-2 in a counterclockwise direction 1051 could transition from a release state 1100 to a locked state 1300.

FIGS. 9A-9E

Figure 9C:
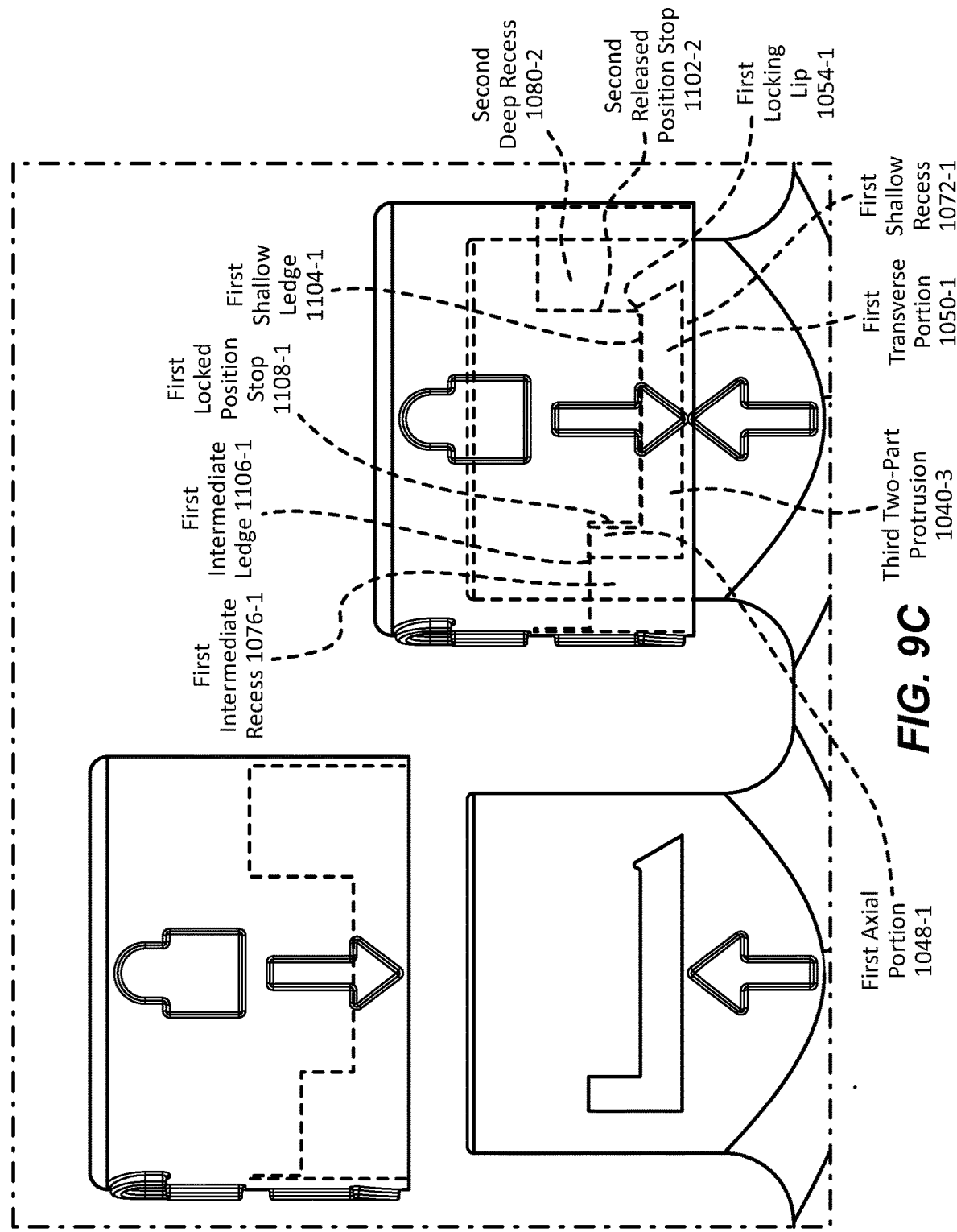
FIG. 9C is an enlarged view of region 9C identified in FIGS. 9A-9B.
Figure 9D:
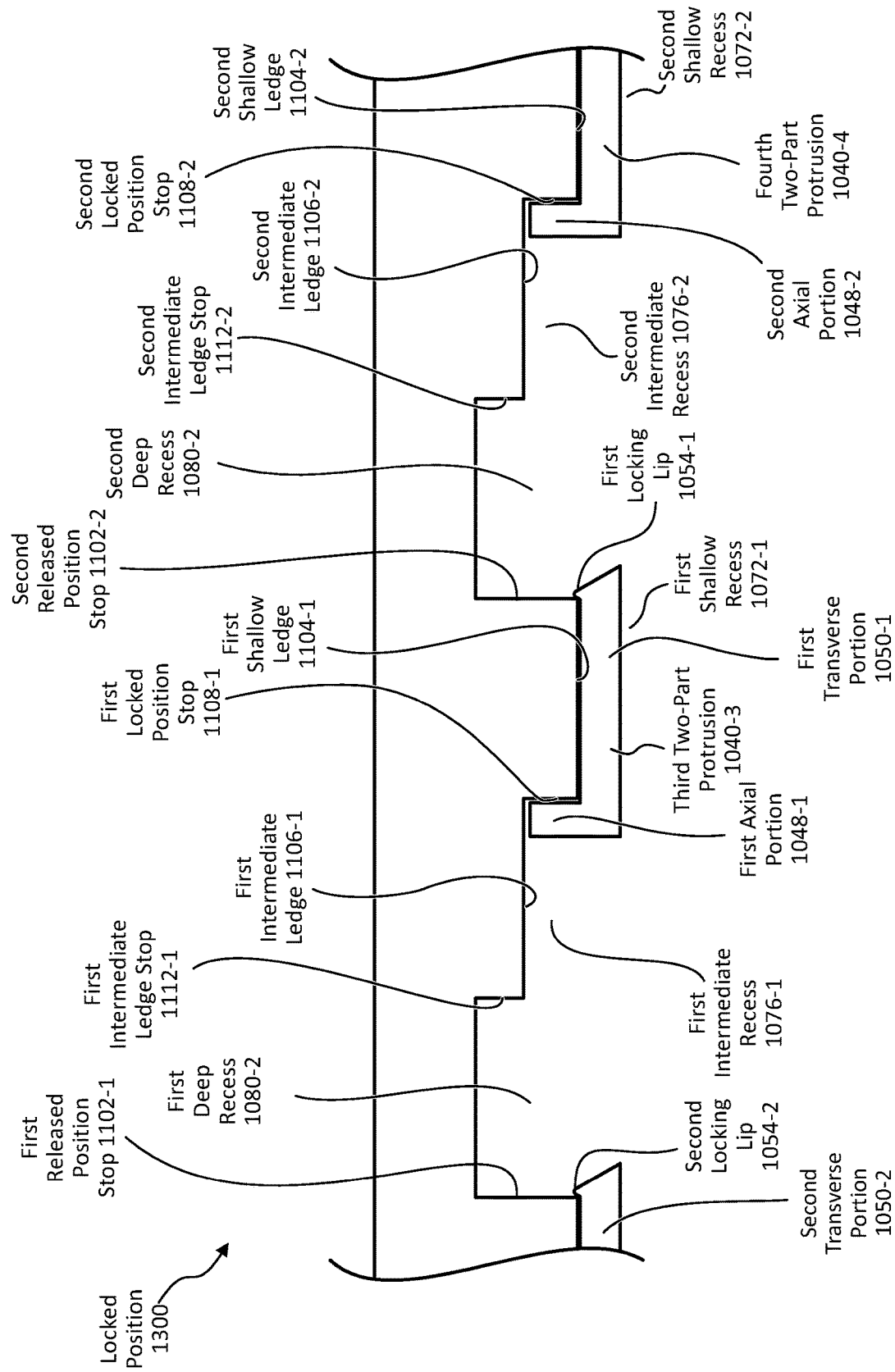
FIG. 9D is a simplified, flattened view of ledges and two two-part protrusions of a coupling of FIG. 1 in a locked position.

FIGS. 9A-9E illustrate each drip line coupling lockable release mechanism 1024-1, 1024-2 in a locked position 1300-a position in which each two-part protrusion 1040-1, 1040-2 engages a corresponding one of the shallow recesses 1072-1, 1072-2. In FIGS. 9A-9C, the first drip line coupling lockable release mechanism 1024-1 is shown in an exploded view-separated from the first drip line coupling body 1016-1—while the second drip line coupling lockable release mechanism 1024-2 is shown disposed on the second drip line coupling body 1016-2 in the locked position 1300. FIG. 9D is a simplified, flattened view of the ledges 1104-1, 1104-2, 1106-1, 1106-2, 1110-1, 1110-2 and two-part protrusion 1040-1, 1040-2 of a drip line coupling 1014-1, 1014-2 of FIG. 1 in a locked position 1300. FIG. 9E is a simplified cross-sectional view illustrating the relative position of an inner release cylinder 1068-2 to a ring of gripping teeth 1060-2 in a locked position 1300, shown together with a conduit 1015.

In the locked position 1300, the axial portion 1048-1, 1048-2 of each two-part protrusion 1040-1, 1040-2 is disposed within a corresponding intermediate recess 1076-1, 1076-02 formed by a corresponding intermediate ledge 1106-1, 1106-2. Each axial portion 1048-1, 1048-2 may abut or be proximate a corresponding locked position stop 1108-1, 1108-2. The transverse portion 1050-1, 1050-2 of each two-part protrusion 1040-1, 1040-2 is disposed within a corresponding shallow recess 1072-1, 1072-2 and intermediate recess 1076-1, 1076-2. As illustrated, each locking lip 1054-1, 1054-2 is disposed within an adjacent deep recess 1080-1, 1080-2 (e.g., a second deep recess 1080-2) and abuts or is proximate a released position stop 1102-1, 1102-2 such that each two-part protrusion 1040-1, 1040-2 engages a shallow ledge 1104-1, 1104-2 to retain the drip line coupling lockable release mechanism 1024-1, 1024-2 in the locked position 1300. In the locked position 1300, movement of the drip line coupling lockable release mechanism 1024-1, 1024-2 along the axial dimension 1030 toward the body of the drip manifold 1012 is limited because of contact between each shallow ledge 1104-1, 1104-2 and each transverse portion 1050-1, 1050-2 such that the drip line coupling inner release cylinder 1068-2 may not be interposed and dislodge the engaging ends 1061 of the drip line coupling ring of gripping teeth 1060-2 from a coupled conduit 1015 (i.e., the engaging ends 1061 are spaced apart from the drip line coupling inner release cylinder 1068-2 by a distance 1055 along the axial dimension 1030), as illustrated in FIGS. 9C-9E. This is helpful to prevent inadvertent removal of the drip line conduit 1015 from the drip manifold 1000. As indicated above, each locked position stop 1108-1, 1108-2 limits rotation of the drip line coupling lockable release mechanism 1024-2 in a clockwise direction 1053 when the axial portion 1048-1, 1048-2 of the two-part protrusion 1040-3, 1040-4 is rotated and abuts the locked position stop 1108-1, 1108-2. It should be noted that the ledges 1104-1, 1104-2, 1106-1, 1106-2, 1110-1, 1110-2 could be configured in a reverse order such that each locked position stop 1108-1, 1108-2 limits rotation of the drip line coupling lockable release mechanism 1024-2 in a counterclockwise direction 1051.

It should be noted that the mechanisms described in connection with the drip line coupling lockable release mechanism 1024-1, 1024-2 illustrated in the figures and described herein are merely illustrative. For example, the shape and number of the various ledges 1104-1, 1104-2, 1106-2, 1106-2, 1110-1, 1110-2 and two-part protrusions 1040-3, 1040-4 may be varied within the scope of the disclosed subject matter to achieve the same function and operation disclosed herein.

FIG. 10

Figure 10:
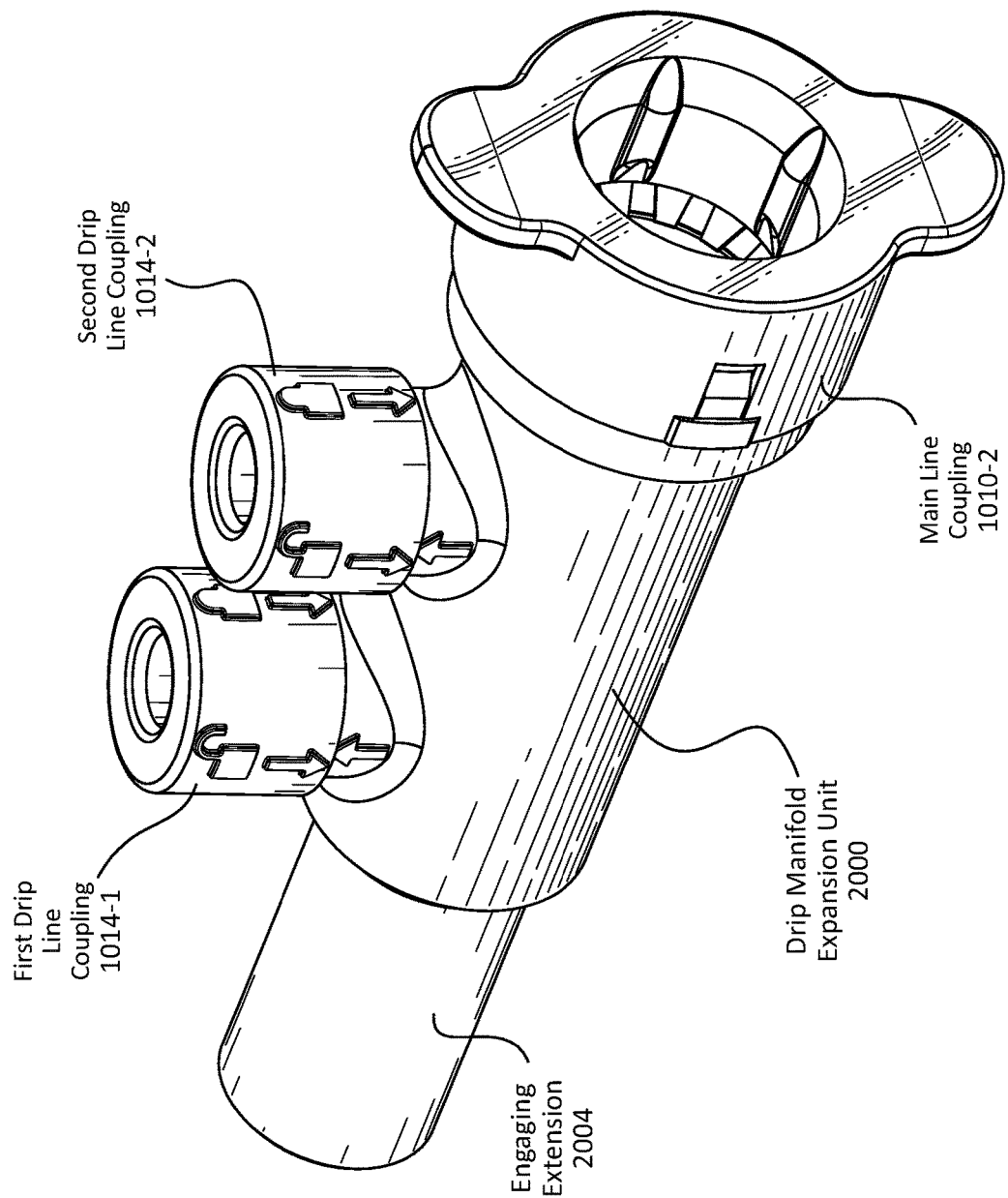
FIG. 10 is an elevated perspective view of one embodiment of a drip manifold expansion unit.

FIG. 10 illustrates a drip manifold expansion unit 2000. The drip manifold expansion unit 2000 may be identical or similar to the drip manifold 1000—illustrated, for example in FIG. 1—except that an engaging extension 2004 is used in place of the first main line coupling 1010-1 or the second main line coupling 1010-2 of the drip manifold 1000 shown in FIG. 1. As a result, the common features will not be discussed again in connection with FIG. 10. The engaging extension 2004 is sized and shaped such that it may be received into and secured to a main line coupling 1010-1, 1010-2 of an adjacent drip manifold 1000 or another drip manifold expansion unit 2000, as illustrated in FIG. 11.

FIG. 11

With reference to FIG. 11, a drip manifold 1000 is illustrated with a first drip manifold expansion unit 2000-1 secured to the drip manifold 1000, and a second drip manifold expansion unit 2000-2 secured to the first drip manifold expansion unit 2000-1. Of course, the number of expansion units 2000-1, 2000-2 that may be used with a drip manifold 1000 may be varied within the scope of the disclosed subject matter. For example, no drip manifold expansion units 2000 may be employed or 12 drip manifold expansion units 2000-1, 2000-2 may be employed. Also, on a main line 1090-1, 1090-2, a number of different groups of manifold units (a drip manifold 1000 optionally with one or more drip manifold expansion units 2000-1, 2000-2) may be employed periodically within the main line 1090-1, 1090-2, such as every 10 feet or at irregular intervals, to facilitate customization of the positioning of drip line couplings 1014-1, 1014-2. Thus, by securing and/or releasing various manifold expansion units 2000-1, 2000-2 using the previously described release mechanisms 1028-1, 1028-2, a drip irrigation system may be customized. This customization may take place not just at the time of the initial construction of the system but, as desired, throughout the life of the system.

FIGS. 12A-14B

Figure 12A:
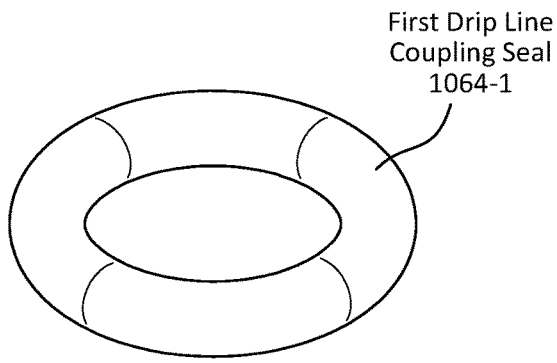
FIG. 12A is an elevated perspective view of one embodiment of a seal that may be used with a drip line coupling.
Figure 12B:
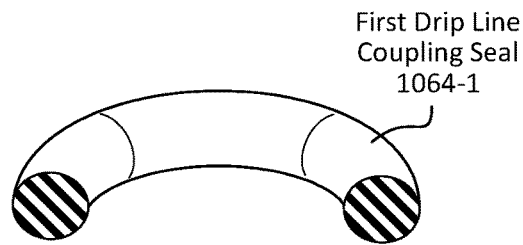
FIG. 12B is an elevated perspective, cross-sectional view of the seal shown in FIG. 12A.

FIG. 12A-14B illustrate various embodiments of seals 1064-1, 3300, 1026-1 that may be used as, for example, a drip line coupling seal 1064-1 or a main line coupling seal 1026-1. The first embodiment, illustrated in FIGS. 12A-12B, is an O-ring seal 1064-1. The O-ring seal 1064-1 may be made of a resilient material, such as rubber or another polymer.

Figure 13A:
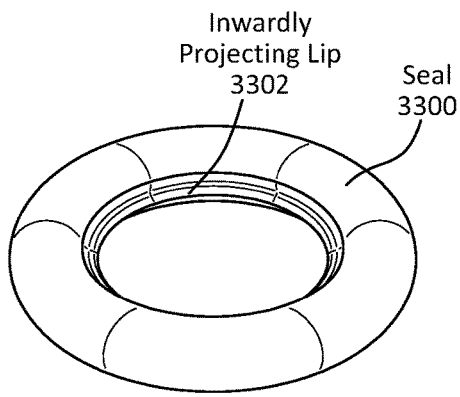
FIG. 13A is an elevated perspective view of one embodiment of a seal that may be used with a drip line coupling.
Figure 13B:
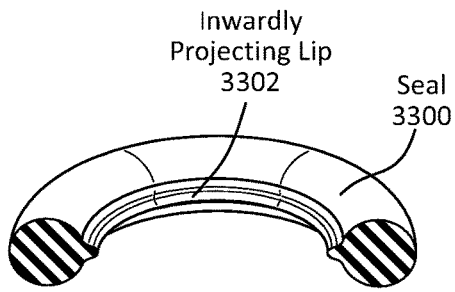

The second embodiment illustrated in FIGS. 13A-13B, comprises a seal 3300 with an inwardly projecting lip 3302. The inwardly projecting lip 3302 accommodates variation in the outer diameter of an engaged conduit within the coupling and may also accommodate some shifting of the engaged conduit within the coupling and still maintains a fluid-tight seal. The inward radial dimension of the inwardly projecting lip 3302 may be varied within the scope of the disclosed subject matter.

Figure 14A:
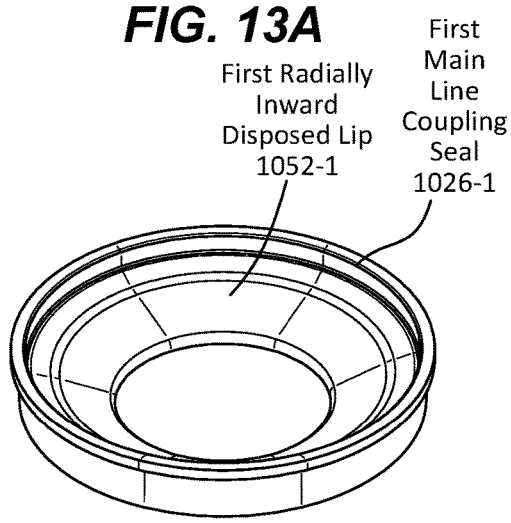
FIG. 14A is an elevated perspective view of one embodiment of a seal that may be used with a drip line coupling.
Figure 14B:
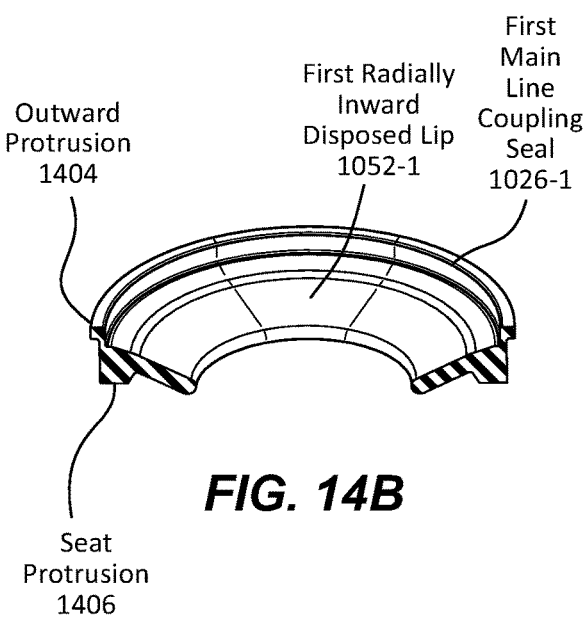
FIG. 14B is an elevated perspective, cross-sectional view of the seal shown in FIG. 14A.

The third embodiment, which is illustrated in FIGS. 14A-14B, of the seal 1026-1 comprises a seat protrusion 1406, an outward protrusion 1404, and a radially inward disposed lip 1052-1. The seat protrusion 1406 may engage with an annular recess, in which the seal 1026-1 may be positioned. The outward protrusion 1404 may engage with, for example, a support ring 1034-1, 1034-2 or another structure situated adjacent to the seal 1026-1. The radially inward disposed lip 1052-1, as with the inwardly projecting lip 3302, enables a fluid tight seal to be maintained even when there is variation in the outer diameter of an engaged conduit or the positioning of the engaged conduit. The inward radial dimension of the radially inward disposed lip 1052-1 may be varied within the scope of the disclosed subject matter.

FIG. 15

Figure 15:
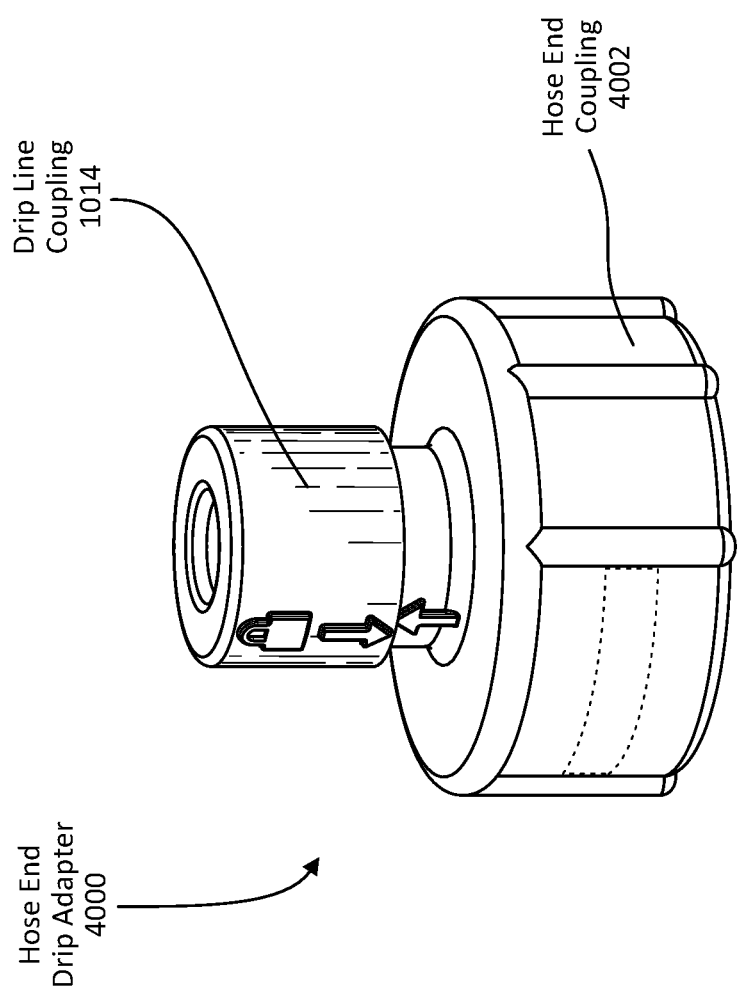
FIG. 15 is an elevated perspective view of a hose end drip adapter.

FIG. 15 is an elevated perspective view of a hose end drip adapter 4000. The hose end drip adapter 4000 comprises a hose coupling 4002 (i.e., a hose end coupling) and a drip line coupling 1014. The hose coupling 4002 may comprise, for example, a threaded connector or a push-fit connector. The drip line coupling 1014 may include, by way of example only, the embodiments of the drip line couplings 1014-1, 1014-2 illustrated and disclosed in the specification and figures herein.

It should be noted that the seals 1064-1, 1064-2, 3300, 1026-1, 1026-2 disclosed and shown in this application are merely examples of the type of seals 1064-1, 1064-2, 3300, 1026-1, 1026-2 that may be used. For example, a drip line coupling 1014-1, 1014-2 may employ a seal 1026-1, 1026-2 of the type shown in connection with the main line coupling seal 1026-1, 1026-2 and vice versa. Also, the O-ring seal 1064-1, 1064-2 illustrated in the drip line coupling 1014-1, 1014-2 as a circular cross-sectional shape (that is, in the shape of a torus). Seals of different cross-sectional shapes may be employed, such as a disc-shaped seal having a central opening.

The body of the manifold 1012 and various components of the manifold 1000 may be made for example of ABS, another type of polymer or even metal. The drip line couplings 1014-1, 1014-2 disclosed herein may be incorporated into a manifold 1000 or other type of irrigation component, such as fittings (tees, elbows, etc.), valves, filters, pressure regulators, emitters, and adapters.

The lockable release mechanisms 1024-1, 1024-2 and two-part protrusions 1040-1, 1040-2, 1040-3, 1040-4 disclosed herein may be incorporated into other types of irrigation line couplings besides drip line couplings 1014-1, 1014-2. For example, lockable release mechanisms 1024-1, 1024-2 and two-part protrusions 1040-1, 1040-2, 1040-3, 1040-4 may be incorporated into main line couplings 1010-1, 1010-2 or other types of irrigation line couplings. When used in this broader sense, the term "irrigation line coupling"

(in plural or singular form) will be used in place of "drip line coupling" (in plural or singular form), and the term "irrigation manifold" (in plural or singular form) will be used in place of "drip manifold" (in plural or singular form).

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. A drip manifold for irrigation comprising a drip line coupling, the drip line coupling comprising:
   a coupling body comprising a two-part protrusion, the two-part protrusion comprising an axial portion extending along an axial dimension of the coupling body, a transverse portion extending along a transverse dimension of the coupling body, and a locking lip;
   a ring of gripping teeth disposed at least partially within the coupling body;
   a lockable release mechanism for engaging with the coupling body, the lockable release mechanism comprising an outer wall, an inner release cylinder, a first deep ledge, a first intermediate ledge, a first shallow ledge, a second deep ledge, a second intermediate ledge, and a second shallow ledge, the first intermediate ledge being circumferentially intermediate the first deep ledge and the first shallow ledge, the first deep ledge being circumferentially intermediate the first intermediate ledge and the second shallow ledge, the first shallow ledge being circumferentially intermediate the first intermediate ledge and the second deep ledge, the second intermediate ledge being circumferentially intermediate the second deep ledge and the second shallow ledge, a first released position stop being circumferentially intermediate the second shallow ledge and the first deep ledge, a first intermediate ledge stop being circumferentially intermediate the first deep ledge and the first intermediate ledge, a first locked position stop being circumferentially intermediate the first intermediate ledge and the first shallow ledge, a second released position stop being circumferentially intermediate the first shallow ledge and the second deep ledge, and a second intermediate ledge stop being circumferentially intermediate the second deep ledge and the second intermediate ledge;
   wherein a first deep recess is bounded by the first deep ledge and is circumferentially intermediate the first released position stop and the first intermediate ledge stop, a first intermediate recess is bounded by the first intermediate ledge and is circumferentially intermediate the first intermediate ledge stop and the first locked position stop, a first shallow recess is bounded by the first shallow ledge and is circumferentially intermediate the first locked position stop and the second released position stop, a second deep recess is bounded by the second deep ledge and is circumferentially intermediate the second released position stop and the second intermediate ledge stop,
   wherein the lockable release mechanism is movable both rotationally and along the axial dimension with respect to the coupling body between a released position and a locked position,
   wherein in the released position, the axial portion is positioned at least in part circumferentially intermediate the first released position stop and the first intermediate ledge stop within the first deep recess and the inner release cylinder is radially inward relative to engaging ends of the ring of gripping teeth, and
   wherein in the locked position, the axial portion is positioned within the first intermediate recess, the transverse portion is positioned at least in part within the first shallow recess, and the locking lip is positioned at least in part within the second deep recess and the inner release cylinder is spaced apart from the engaging ends of the ring of gripping teeth along the axial dimension.

2. The drip manifold of claim 1, wherein the axial portion comprises an inclined face disposed on an end of the axial portion adjacent to the locking lip.

3. The drip manifold of claim 2, wherein the coupling body further comprises a second two-part protrusion.

4. The drip manifold of claim 3, wherein the two-part protrusion and the second two-part protrusion are disposed on opposite sides of the coupling body.

5. The drip manifold of claim 4, wherein each of the first deep ledge, the first intermediate ledge, the first shallow ledge, the second deep ledge, the second intermediate ledge, and the second shallow ledge are disposed radially inward with respect to the outer wall.

6. The drip manifold of claim 1, further comprising a first main line coupling and a second main line coupling in fluid communication with a body of the drip manifold, the coupling body also being in fluid communication with the body of the drip manifold, at least one of the first and second main line couplings comprising a ring of gripping teeth.

7. The drip manifold of claim 6, further comprising a drip manifold expansion unit comprising an engaging extension that is cylindrical in shape and is further shaped and sized for engaging with either the first or the second main line coupling, the drip manifold expansion unit comprising at least a second drip line coupling.

8. A drip line coupling comprising:
   a coupling body comprising a two-part protrusion, the two-part protrusion comprising an axial portion extending along an axial dimension of the coupling body, a transverse portion extending along a transverse dimension of the coupling body, and a locking lip;
   a ring of gripping teeth disposed at least partially within the coupling body;
   a lockable release mechanism for engaging with the coupling body, the lockable release mechanism comprising an outer wall, an inner release cylinder, a first deep ledge, a first intermediate ledge, and a first shallow ledge;
   wherein a first deep recess is bounded by the first deep ledge and is circumferentially intermediate opposing ends of the first deep ledge, a first intermediate recess is bounded by the first intermediate ledge and is circumferentially intermediate opposing ends of the first intermediate ledge, a first shallow recess is bounded by the first shallow ledge, and is circumferentially intermediate opposing ends of the first shallow ledge,
   wherein the lockable release mechanism is movable both rotationally and along the axial dimension with respect to the coupling body between a released position and a locked position,
   wherein in the released position, the axial portion is positioned at least partially within the first deep recess and the inner release cylinder is radially inward relative to engaging ends of the ring of gripping teeth, and wherein in the locked position, the axial portion is positioned within the first intermediate recess, the transverse portion is positioned at least in part within the first shallow recess and the inner release cylinder is spaced apart from the engaging ends of the ring of gripping teeth along the axial dimension.

9. The drip line coupling of claim 8, wherein the axial portion comprises an inclined face disposed on an end of the axial portion adjacent to the locking lip.

10. The drip line coupling of claim 9, wherein the coupling body further comprises a second two-part protrusion.

11. The drip line coupling of claim 10, wherein the two-part protrusion and the second two-part protrusion are disposed on opposite sides of the coupling body.

12. The drip line coupling of claim 11, wherein each of the first deep ledge, the first intermediate ledge, and the first shallow ledge are disposed radially inward relative to the outer wall.

13. An irrigation line coupling comprising:
- a coupling body comprising a two-part protrusion, the two-part protrusion comprising an axial portion extending along an axial dimension of the coupling body, a transverse portion extending along a transverse dimension of the coupling body, and a locking lip;
- a ring of gripping teeth disposed at least partially within the coupling body;
- a lockable release mechanism for engaging with the coupling body, the lockable release mechanism comprising an outer wall, an inner release cylinder, a first deep ledge, a first intermediate ledge, and a first shallow ledge;
- wherein a first deep recess is bounded by the first deep ledge and is circumferentially intermediate opposing ends of the first deep ledge, a first intermediate recess is bounded by the first intermediate ledge and is circumferentially intermediate opposing ends of the first intermediate ledge, a first shallow recess is bounded by the first shallow ledge and is circumferentially intermediate opposing ends of the first shallow ledge,
- wherein the lockable release mechanism is movable both rotationally and along the axial dimension with respect to the coupling body between a released position and a locked position,
- wherein in the released position, the axial portion is positioned at least partially within the first deep recess and the inner release cylinder is radially inward relative to engaging ends of the ring of gripping teeth, and
- wherein in the locked position, the axial portion is positioned within the first intermediate recess, the transverse portion is positioned at least in part within the first shallow recess and the inner release cylinder is spaced apart from the engaging ends of the ring of gripping teeth along the axial dimension.

14. The irrigation line coupling of claim 13, wherein the axial portion comprises an inclined face disposed on an end of the axial portion adjacent to the locking lip.

15. The irrigation line coupling of claim 14, wherein the coupling body further comprises a second two-part protrusion.

16. The irrigation line coupling of claim 15, wherein the two-part protrusion and the second two-part protrusion are disposed on opposite sides of the coupling body.

17. The irrigation line coupling of claim 16, wherein each of the first deep ledge, the first intermediate ledge, and the first shallow ledge are disposed radially inward relative to the outer wall.

* * * * *

UNITED STATES PATENT AND TRADEMARK OFFICE
CERTIFICATE OF CORRECTION

PATENT NO. : 11,274,781 B1
APPLICATION NO. : 16/696927
DATED : March 15, 2022
INVENTOR(S) : Christopher James Kamerath and Eric Tres Wangsgaard It is certified that error appears in the above-identified patent and that said Letters Patent is hereby corrected as shown below:

In the Specification

In Column 2, Line 48: Replace "FIG. 13A is an elevated" with --FIG. 13B is an elevated--
In Column 6, Lines 63-64: Replace "release mechanism make may be distributed" with --release mechanism may be distributed--
In Column 8, Lines 48-49: Replace "exploded view-separated from" with --exploded view—separated from--
In Column 9, Lines 28-29: Replace "intermediate position 1200-a position intermediate" with --intermediate position 1200—a position intermediate--
In Column 9, Line 32: Replace "exploded view-separated from" with --exploded view—separated from--
In Column 10, Lines 19-20: Replace "locked position 1300-a position" with --locked position 1300—a position--
In Column 10, Lines 23-24: Replace "exploded view-separated from" with --exploded view—separated from--

In the Claims

In Column 14, Line 58: Replace "first shallow ledge, and is" with --first shallow ledge and is--

Signed and Sealed this
Twenty-seventh Day of December, 2022

Katherine Kelly Vidal
*Director of the United States Patent and Trademark Office*